United States Patent [19]
Mitchell et al.

[11] Patent Number: 5,847,955
[45] Date of Patent: Dec. 8, 1998

[54] SYSTEM AND METHOD FOR CONTROLLING AN INSTRUMENTATION SYSTEM

[75] Inventors: Bob Mitchell; Hugo Andrade, both of Austin; Jogen Pathak, Dallas; Samson DeKey, Austin; Abhay Shah, Loving; Todd Brower, Austin, all of Tex.

[73] Assignee: National Instruments Corporation, Austin, Tex.

[21] Appl. No.: 880,340

[22] Filed: Jun. 23, 1997

Related U.S. Application Data

[63] Continuation-in-part of Ser. No. 238,480, May 4, 1994, Pat. No. 5,724,272, Ser. No. 438,438, May 10, 1995, Pat. No. 5,717,614, and Ser. No. 544,286, Oct. 17, 1995, Pat. No. 5,710,727.

[51] Int. Cl.⁶ .................................................. G06F 19/00
[52] U.S. Cl. ........................... 364/191; 345/970; 702/123
[58] Field of Search ........................... 364/130, 131–137, 364/191, 192, 188, 189; 702/121, 122, 123, 81–84; 345/964–970, 329, 333; 395/200.76, 651, 652; 707/103

[56] References Cited

U.S. PATENT DOCUMENTS

| | | | |
|---|---|---|---|
| 4,855,905 | 8/1989 | Estrada et al. | 395/200.76 |
| 5,111,423 | 5/1992 | Kopec, Jr. et al. | 395/500 |
| 5,191,655 | 3/1993 | Sarkissian | 395/824 |
| 5,337,262 | 8/1994 | Luthi et al. | 702/83 |
| 5,359,546 | 10/1994 | Hayes et al. | 702/123 |
| 5,361,336 | 11/1994 | Atchison | 702/122 |
| 5,390,325 | 2/1995 | Miller | 395/183.14 |
| 5,710,727 | 1/1998 | Mitchell et al. | |
| 5,717,614 | 2/1998 | Mitchell et al. | |
| 5,724,272 | 3/1998 | Mitchell et al. | |
| 5,754,426 | 5/1998 | Dumais | 345/970 X |
| 5,784,275 | 7/1998 | Sojoodi et al. | 364/191 |

OTHER PUBLICATIONS

Marketing brochures and product literature for instrumentation systems produced by Bruel & Kjaer, including the Modular Test System Type 3538, available at the Auto TestCon instrumentation conference in 1991.

Slide presentation on the Bruel & Kjaer Modular Test System, 1991.

*Hewlett Packard SICL Standard Instrument Control Library for C Programming*, Lee Atchison, VXI Systems Division, Hewlett Packard Company, Jan. 21, 1994, Revision 3.9, pp. i–iii, 1–136, Index.

*Primary Examiner*—Joseph Ruggiero
*Attorney, Agent, or Firm*—Conley, Rose & Tayon; Jeffrey C. Hood

[57] ABSTRACT

A system and method for controlling a computer-based instrumentation system which provides simplified application development and improved performance for instrumentation systems. The present invention provides a system including a software architecture which defines the control and management of an instrumentation system. The present invention includes a base object class, an object manager, session and resource classes, and one or more resource templates. The instrumentation system of the present invention provides a plurality of instrument control resources which are used as building blocks to create instrument drivers and higher level applications. The present invention also uses object oriented technology which allows device resources to be easily combined to create higher level applications. The present invention is independent of I/O interface type, operating system, and programming language while also providing a common look and feel and consistent API to the user. The present invention includes novel methods for access control, event handling, resource management, and resource addressing, among others.

45 Claims, 20 Drawing Sheets

Example VISA Configuration

Example VISA Distributed Configuration

VISA Resource Classes vs. VISA Resources

SYSTEM AND METHOD FOR CONTROLLING AN INSTRUMENTATION SYSTEM

CONTINUATION DATA

This is a continuation-in-part of application Ser. No. 08/238,480 titled "Method and Apparatus for Controlling an Instrumentation System" filed May 4, 1994, now U.S. Pat. No. 5,724.272, whose inventors were Bob Mitchell, Hugo Andrade, Jogen Pathak, Samson DeKey, Abhay Shah, and Todd Brower, and which was assigned to National Instruments Corporation.

This is also a continuation-in-part of co-pending application Serial No. 08/438,438 titled "System and Method for Handling Events in an Instrumentation System" filed May 10, 1995, now U.S. Pat. No. 5,717,614, whose inventors were Abhay Shah, Jogen Pathak, Bob Mitchell, Hugo Andrade, Samson DeKey, and Todd Brower, and which was assigned to National Instruments Corporation.

This is also a continuation-in-part of co-pending application Serial No. 08/544,286 titled "System and Method for Creating Resources in an Instrumentation System" filed Oct. 17, 1995, now U.S. Pat. No. 5,710,727, whose inventors were Bob Mitchell, Hugo Andrade, Jogen Pathak, Samson DeKey, Abhay Shah, and Todd Brower, and which was assigned to National Instruments Corporation.

FIELD OF THE INVENTION

The present invention relates to driver level control software for instrumentation systems, and more particularly to a system and method for creating resources, including instrument driver resources, in an instrumentation system.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modern instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into four distinct types, including IEEE 488-controlled instruments (GPIB instruments), VXI bus instruments, plug-in data acquisition (DAQ) boards, and RS-232-controlled (serial) instruments. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were drafted, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME eXtension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message based instruments and register based instruments. A message based instrument is an instrument which is controlled by a string of ASCII characters, whereas a register based instrument is controlled by writing a bit stream of 1's and 0's directly to registers in the instrument hardware.

An instrumentation system using a data acquisition interface method typically includes transducers which sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system. A computer can also control an instrumentation system through the computer's serial or RS-232 port. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently requires the involvement of a programmer to develop software for acquisition, analysis and presentation of instrumentation data.

The software architecture for a virtual instrumentation system comprises several components. The top level of the software architecture typically comprises an applications program used for high level control of the virtual instrument. Examples of high level applications programs for instrumentation control are LabVIEW and LabWindows from National Instruments Corp. Other examples of applications programs are HP VEE from Hewlett-Packard and Wavetest from Wavetek Corp. among others. These applications programs provide a user with the tools to control instruments, including acquiring data, analyzing data, and presenting data.

The applications programs mentioned above typically operate in conjunction with one or more instrument drivers to interface to actual physical instruments. For example, the LabVIEW and LabWindows applications software each include instrument libraries comprising drivers for more than three hundred GPIB, VXI, and RS-232 instruments from numerous manufacturers. The instrument drivers are designed to reduce a user's application development time by providing intuitive high level functions that relieve the user of complex low level instrument programming.

A software level referred to as driver level software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, and NI-VXI driver level software offered by National Instruments, Inc., which have become a de facto standard in the industry. Another example of driver level software is the Standard Instrument Control Library (SICL) offered by Hewlett-Packard.

A primary problem with traditional driver level software is that there generally is no common look and feel and no common programming constructs. Because of various inconsistencies in driver level software, developers of instrument driver software, who many times are non-professional software engineers, typically do not use the full platform capabilities available, such as interrupt handling, register based control, and triggers. Further, developers of instruments driver software often do not include centralized management of resources, and thus instrument drivers may conflict. As a result, various implementations of instrument driver software do not use the full functionality of the instrument being controlled. Also, there is no common creation mechanism or requirements, no common source code and no common testing criteria.

One important requirement of I/O control software is referred to as I/O interface independence. When users write application software to control a specific set of instruments, they typically want their applications to work with a variety of hardware for a respective I/O interface, perhaps even supplied from different vendors. A user controlling GPIB instruments with a PC, for example, may want to use a plug-in GPIB card in one application and use an external SCSI-to-GPIB interface box in another application. A consistent I/O software interface for these two approaches would allow the user to do this without modifying his application software code.

Another aspect of interface independence has become of interest to more and more users, especially those who are using VXI technology. Rather than simply developing software that is hardware independent for a respective I/O interface, i.e., software for a particular GPIB instrument that is independent of the computer-to-GPIB interface hardware used, many users desire the ability to write software that is also independent of the type of I/O interface used, such as whether GPIB, VXI, serial or some other type of connection is used between the computer and the instrument. For example, a user may want to write one piece of software to control an instrument that has options for both GPIB and RS-232 control. As another example, a user may want to write software to control a VXI instrument and have that software work whether the computer is embedded in the VXI chassis, connected to VXI through the MXI bus, or connected to VXI through a GPIB-to-VXI translator.

Therefore, instrumentation programmers desire the ability to write software that is independent of hardware, operating system and I/O interface. It is also greatly desirable for the software API of an instrumentation system to have a common look and feel as well as more consistent implementations for cross-platform development and integration, cross-product development and integration, and the reusability of source code. Also, the new I/O control software architecture should not only provide access to new capabilities, but must also bridge with the past and provide a smooth migration path for the installed base and huge investment in existing systems.

One attempt to create a driver level software layer that is I/O interface independent is the Standard Instrument Control Library (SICL) developed by Hewlett-Packard Corp. SICL uses a methodology of creating APIs with interface independence that includes a purely top-down approach which merges the capabilities of a group of hardware interfaces into a two-piece API. The first element of the API includes the overlap between all of the interfaces, referred to as the core, and the second element is the set of all of the interface-specific routines.

One drawback to the SICL I/O Library is that SICL is not object-oriented, and thus applications and/or instrument drivers cannot be created which derive or inherit functionality from different types or different objects. This limits the use of SICL in creating higher level applications, such as instrument drivers and other test and measurement applications.

Therefore, an improved system and method is desired for controlling instrumentation systems and for providing a user or developer with the capability to develop instrument drivers and application software for controlling instrumentation systems. An instrument software architecture is desired which is independent of I/O interface type, operating system, and programming language while also providing a common look and feel and consistent API to the user.

SUMMARY OF THE INVENTION

The present invention comprises a system and method for controlling an instrumentation system that is independent of I/O interface. The present invention provides a software architecture which defines the control and management of an instrumentation system. The system and method of the present invention also uses object oriented technology which allows device resources to be easily combined to create higher level applications. The present invention is independent of I/O interface type, operating system, and programming language while also providing a common look and feel and consistent API to the user. The present invention provides simplified application development and improved performance for instrumentation systems.

The instrumentation system of the present invention provides a plurality of instrument control resources which are used as building blocks to create instrument drivers and higher level applications. The present invention utilizes a device resource independence approach whereby the individual capabilities of devices are broken down into a plurality of objects called resources, and these resources are then used to develop instrument drivers or instrument control applications. Thus the present invention provides a single I/O interface or library which enables a user to control all types of instruments using any of the various types of I/O interfaces. Due to its object oriented nature, the present invention can operate transparently in distributed environments.

The preferred embodiment of the invention includes a VISA Object Manager which provides capabilities to control and manage objects, wherein an object is an instance of a class. The VISA Object Manager includes important capabilities, such as the registration of interface definitions, the creation and destruction and objects, characteristic control, and operation invocation. The interface registration services are used to register interface descriptions for classes of objects. The life cycle service is used by a client application to create and destroy objects and also to free up associated system resources whenever a client uninitializes the environment. The characteristic control services are used to get or set the value of an attribute if that attribute is exported by an object. The operation invocation service allows the objects to communicate with one another by invoking operations. This service also provides mechanisms to report the completion status of operations. The VISA Object Manager thus comprises an object management environment and a base class definition referred to as the ViObject class. All other classes in the VISA system of the present invention inherit functionality from the ViObject class.

The present invention includes a plurality of instrument control resource classes. The resource classes each represent the smallest, logical, divisible capability of an instrument, and these resource classes act as building blocks for user applications and instrument drivers. A resource class generally is a definition of a particular capability of a device (such as read, write, trigger, poll, service request, etc.). A resource class is also the specific definition of how to create a resource, i.e., a template for the creation of resources. Each resource performs one or more operations and includes one or more attributes.

A resource is a particular implementation or instance of a resource class which abstracts the functionality of an instrument device capability. More particularly, a resource is the particular instance of an instrument control resource class for a specific capability of a specific device in the system (e.g. a GPIB read port of a GPIB device at primary address 5). Resources fall into one of two general types, these being a basic resource and a compound resource. A basic resource is a wholly contained software module that does not require other resources for operation. A compound resource is a software module that utilizes one or more basic and/or compound resources to provide a higher level of operation. Thus the preferred embodiment includes a grouping of resource classes referred to as the instrument control resource classes for controlling GPIB, VXI, and serial instruments as well as data acquisition boards.

The present invention further includes a resource referred to as the INSTR resource. The INSTR resource is a combination of resources which model the functionality of an instrument. For example, in one embodiment, the INSTR resource comprises read, write, trigger, poll, and clear services. The INSTR resource may comprise other groupings of resources to provide various types of instrument functionality. The INSTR resource comprises the fundamental building block for instrumentation control applications.

A session is a term used to designate a communication channel between a user's application and a resource. A session describes and implements the behavior of individual connections to resources. In essence, a session is an instance of a session class, much the same way a resource is an instance of a resource class. Resources can have multiple sessions open to them. In addition, a resource can control one or more other resources.

The preferred embodiment of the present invention includes a plurality of VISA Templates that operate as base classes from which resources receive their interface. The VISA Templates comprise a precisely defined extensible interface which provide a well-defined set of services. In general, each VISA resource derives its interface from the template set that provides standard services for the resource. The VISA Templates provide basic services, including session termination control, local/global attribute management, access control, and basic communication services, such as operation invocation, and event reporting. The VISA Templates also define various communications services among resources and between applications and resources through operation invocation and the exchange of information through events.

The VISA Resource Manager derives its interface from the VISA Resource and Session Templates and is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources locating resources (location search), and management of session creation, among others. The VISA Resource Manager includes an API for these management needs, and all defined resources may use these capabilities.

The VISA Resource Manager allows a user to open a session to any resource in the system, including only single device capabilities such as a single trigger line or single write port on a device. In one embodiment of the invention, the instrument control resources include a resource referred to as the VISA Instrument Control Organizer Resource (VICO) which allows for the creation of user-defined resource groupings (virtual instruments) of the instrument control resources. A virtual instrument, in this context, is a name given to a unique session to a resource to provide the functionality of a traditional, stand-alone instrument. VICO is included in this embodiment to provide a higher level user interface so that users can communicate with instrumentation at a higher level of abstraction. VICO is a resource similar to other resources in the system, but is unique, however, in the sense that it serves only one unique service specifically for the instrument control resources. Thus VICO encapsulates features of the resources for users who desire a simple interface.

An instrumentation system according to the preferred embodiment also includes various utilities for installation and configuration, including a startup resource manager, a VISA Interactive Control utility for investigating the system, a configuration utility, a monitor utility, a resource generation utility, and an install utility.

At startup of the system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operation, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications and/or to create other resources. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. The developer can create a higher level resource that uses other resources, much the same way that a client uses resources, or the developer can create a higher level resource that incorporates or inherits functionality from one or more resources. As an example of a higher level resource, a developer can develop a base resource that embodies all of the functionality of a type of instrument, i.e., a class of instruments of a certain type. Resources may then be constructed to control specific instruments of that type, wherein these resources inherit or derive from the base resource and thus share a common interface.

Therefore, the present invention comprises a system and method for controlling an instrumentation system. The present invention includes a base object class, an object manager, a resource manager, one or more resource templates, and a plurality of instrument control resources. The present invention also includes session and resource classes which provide functionality for resources. The present invention allows for greater flexibility and greater reusability of code as well as simplified driver and/or application development.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. patent application Ser. No. 08/238,480 titled "Method and Apparatus for Controlling an Instrumentation System" filed May 4, 1994, now U.S. Pat. No. 5,724,272, whose inventors were Bob Mitchell, Hugo Andrade, Jogen Pathak, Samson DeKey, Abhay Shah, and Todd Brower, and which was assigned to National Instruments Corporation, is hereby incorporated by reference in its entirety as though fully set forth herein, including the appendices therein. The above-referenced patent application discloses a system referred to as the Virtual Instrument Software Architecture (VISA), which is being formulated as IEEE standard 1226.5 and VXI Plug&Play specification VPP 4.1.

U.S. patent application Ser. No. 08/438,438 titled "System and Method for Handling Events in an Instrumentation System" filed May 10, 1995, mow U.S. Pat. No. 5,717,614, whose inventors were Abhay Shah, Jogen Pathak, Bob Mitchell, Hugo Andrade, Samson DeKey, and Todd Brower, and which was assigned to National Instruments Corporation, is hereby incorporated by reference in its entirety.

U.S. patent application Ser. No. 08/544,286 titled "System and Method for Creating Resources in an Instrumentation System" filed Oct. 17, 1995, now U.S. Pat. No. 5,710,727, whose inventors were Bob Mitchell, Hugo Andrade, Jogen Pathak, Samson DeKey, Abhay Shah, and Todd Brower, and which was assigned to National Instruments Corporation, is hereby incorporated by reference in its entirety as though fully set forth herein, including the appendix therein.

Instrumentation I/O Interface Options

Figure 1:
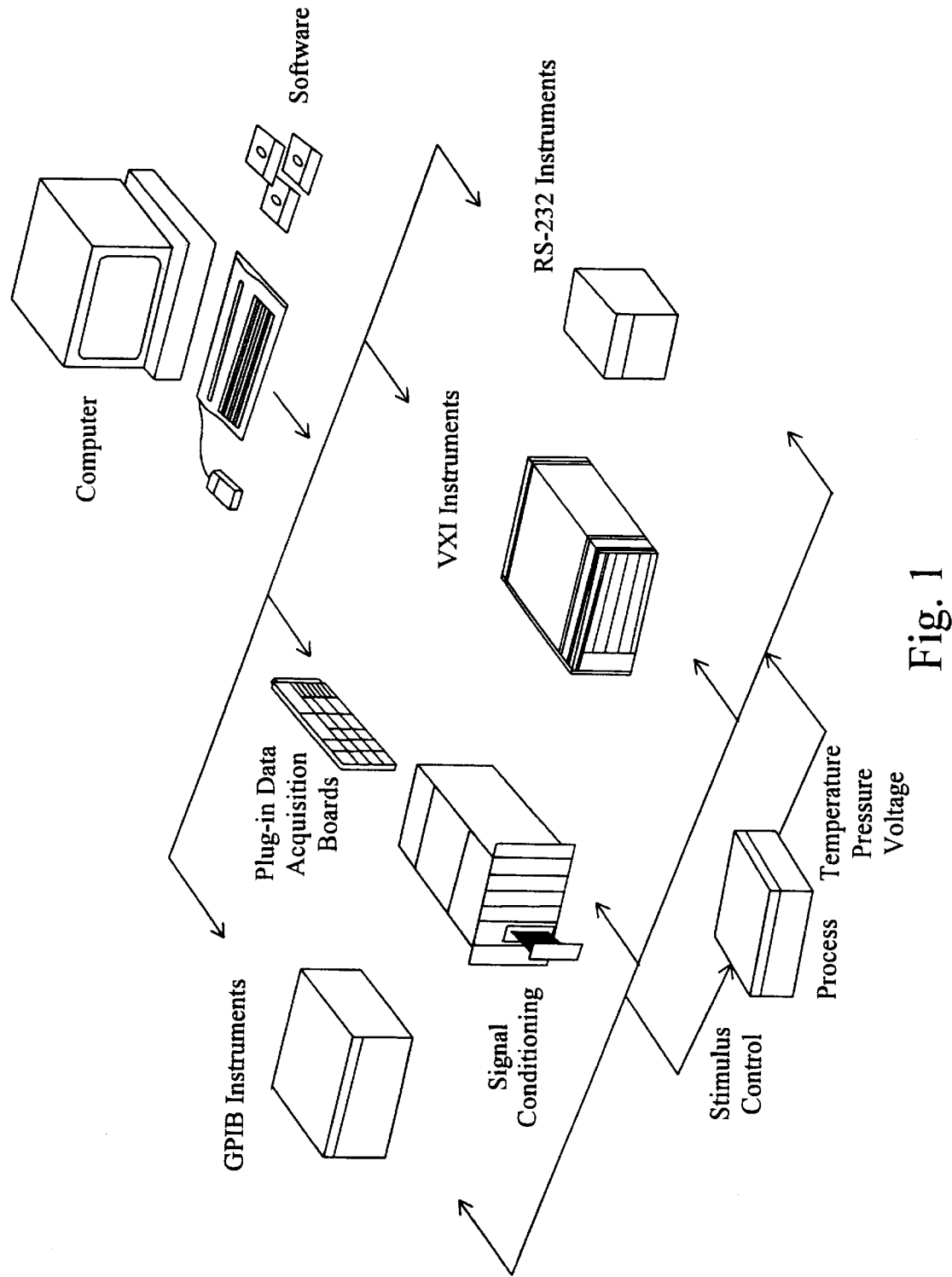
FIGS. 1 and 2 illustrate representative instrumentation control systems of the present invention including various I/O interface options.
Figure 2:
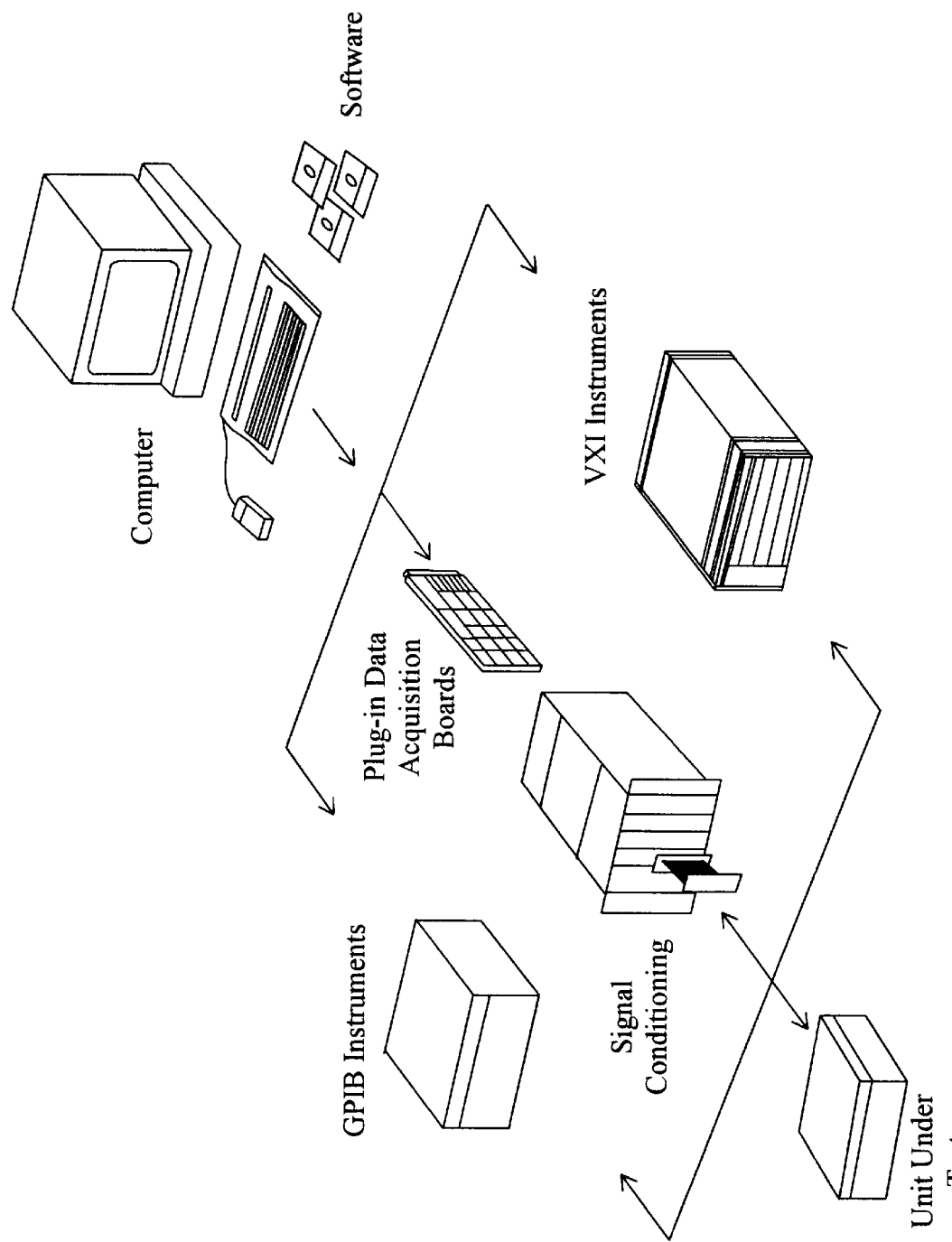

Referring now to FIGS. 1 and 2, the various hardware I/O interface options currently available for instrumentation systems are shown. FIG. 1 illustrates the choices available in a data acquisition and control application, and FIG. 2 illustrates the choices available in a test and measurement application. As shown, a computer system can interface with a process or unit under test using a number of methods, including IEEE 488-controlled instruments (GPIB instruments), plug-in data acquisition (DAQ) boards, RS-232-controlled (serial) instruments, and VXI bus instruments. In the present disclosure, the term "instrument" is used to refer to "traditional" instruments such as GPIB instruments and RS-232 instruments, as well as VXI bus instruments configured as plug-in cards to a VXI backplane. The term "instrument" is also used to refer to a data acquisition board in a computer system. In addition, the term instrument also refers to "virtual instruments" (combinations of hardware and/or software instruments) executing on a computer system, including VISA resources. In addition, the term "instrumentation system" is used herein to refer to test and measurement systems as well as process control and modeling systems, among others.

Computer System Block Diagram

Figure 3:
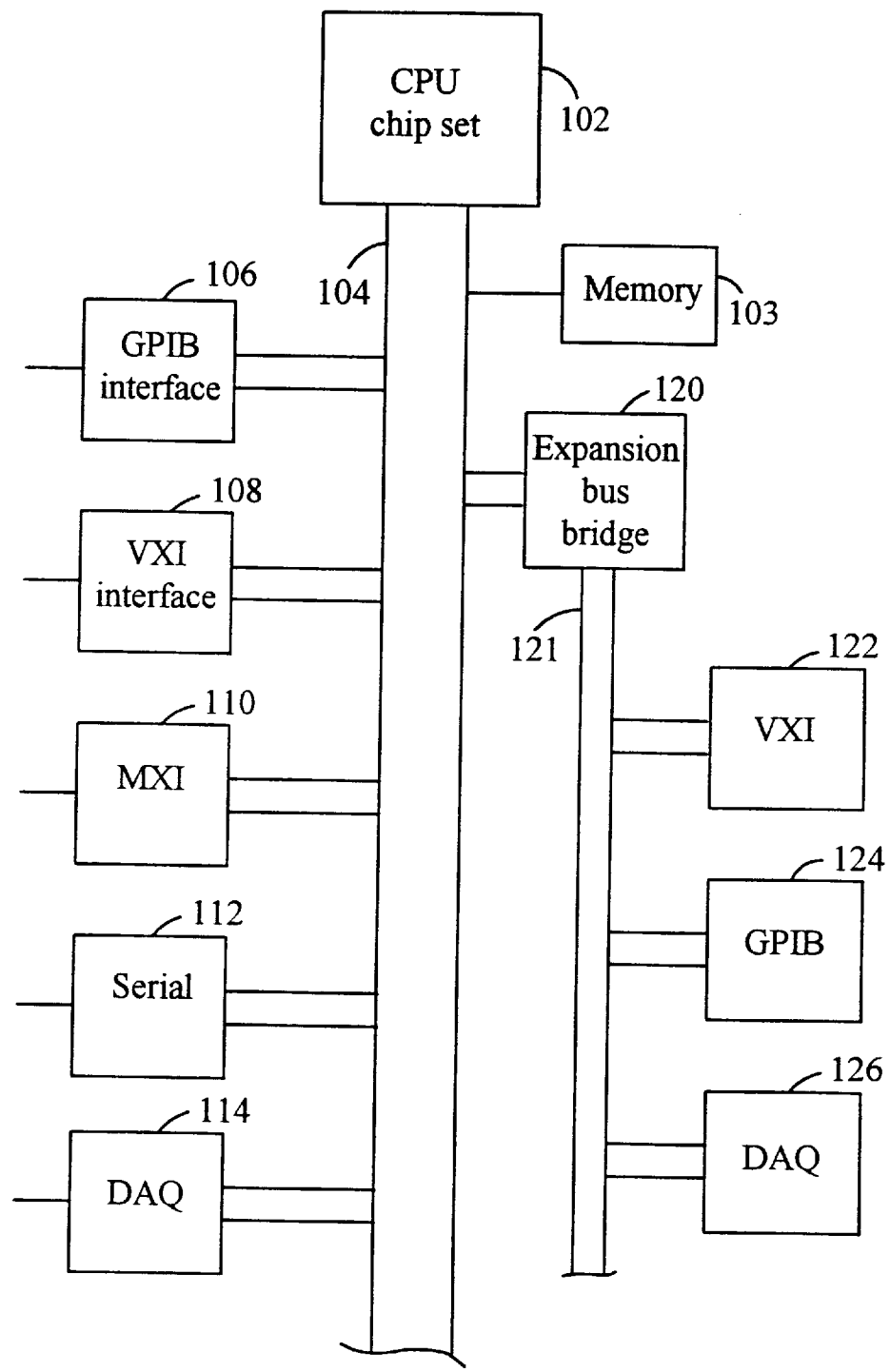
FIG. 3 is a block diagram of a computer system used to control an instrumentation system.

Referring now to FIG. 3, a block diagram of the computer system illustrated in FIGS. 1 and 2 is shown. It is noted that any type of computer system configuration can be used as desired, and FIG. 3 illustrates a representative embodiment. It is also noted that the computer system may be a general purpose computer system as shown in FIGS. 1 and 2, a computer implemented on a VXI card installed in a VXI chassis, or other types of embodiments.

As shown, the computer system includes a central processing unit (CPU) 102 which includes a CPU bus 104. The computer system also includes a memory 103 for storing various software elements of the present invention. The CPU bus 104 is preferably a Peripheral Component Interconnect (PCI) bus, although other types of buses may be used. A GPIB control block 106 connects to the CPU bus 104 and interfaces the CPU 102 to one or more GPIB instruments, as desired. The GPIB control block 106 is preferably the TNT4882 chip produced by National Instruments Corp. A VXI control block 108 couples between the CPU bus 104 and one or more VXI instruments. A MXI interface 110 interfaces the CPU 102 to one or more MXI instruments and a serial interface 112 interfaces to one or more serial instruments. A data acquisition card 114 receives data from a device or unit under test (UUT) and provides this data to the CPU 102. An expansion bus bridge 120 is coupled between the CPU bus 104 and an expansion bus 121. The expansion bus 121 may b e any of a number of types, including an AT or ISA (Industry Standard Architecture) bus, MCA (MicroChannel Architecture) bus, EISA (Extended Industry Standard Architecture) bus, NuBus, etc. One or more of a VXI interface 122, GPIB interface 124, and DAQ interface 126 are preferably coupled to the expansion bus 121, as shown.

Software Architecture (Prior Art)

Figure 4:
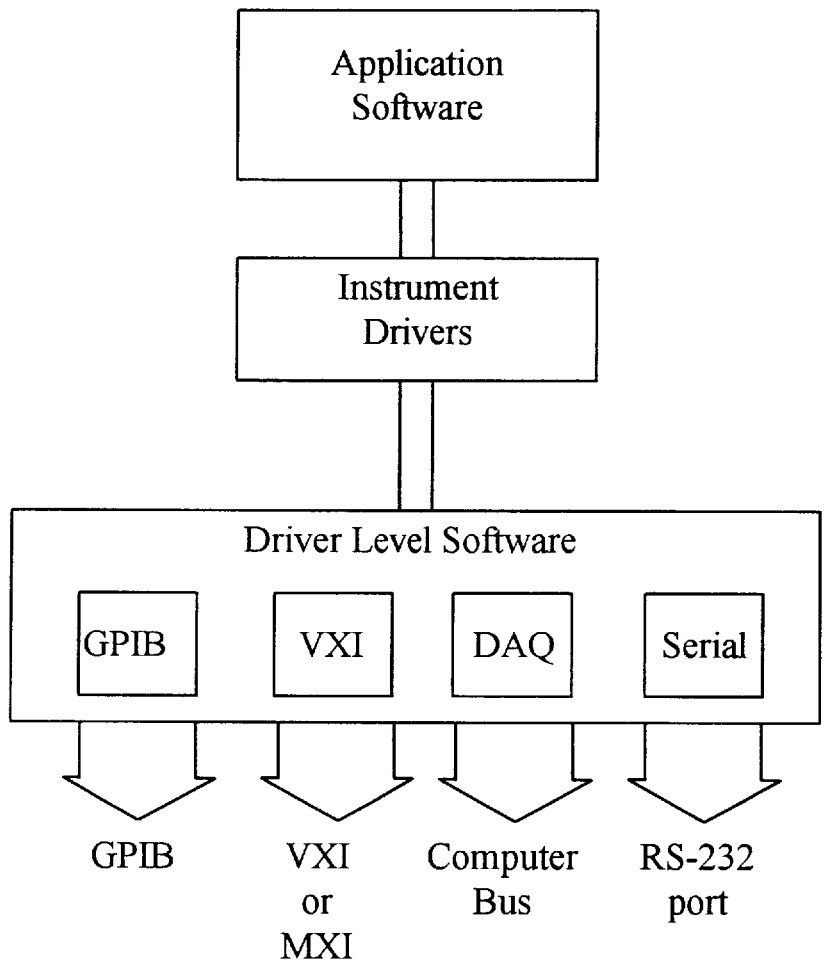
FIG. 4 illustrates the current software architecture for instrumentation systems.

Referring now to FIG. 4, a diagram illustrating a representative software architecture for an instrumentation system is shown. As discussed in the background section, the top level of the software architecture typically comprises an applications program used for high level control of the virtual instrument. The applications programs typically operate in conjunction with one or more instrument drivers to interface to actual physical instruments. The instrument drivers are designed to reduce a user's application development time by providing intuitive high level functions that relieve the user of complex low level instrument programming.

A software level referred to as driver level software or I/O control software is below the instrument driver level. Driver level software is used to interface the commands in the instrument driver to the actual hardware interface being used, such as a GPIB interface card, a data acquisition card, or a VXI card. In other words, driver level software handles the details of communication, i.e. the transfer of commands and data, over a physical connection between the computer and instruments.

VISA System Architecture

Figure 5:
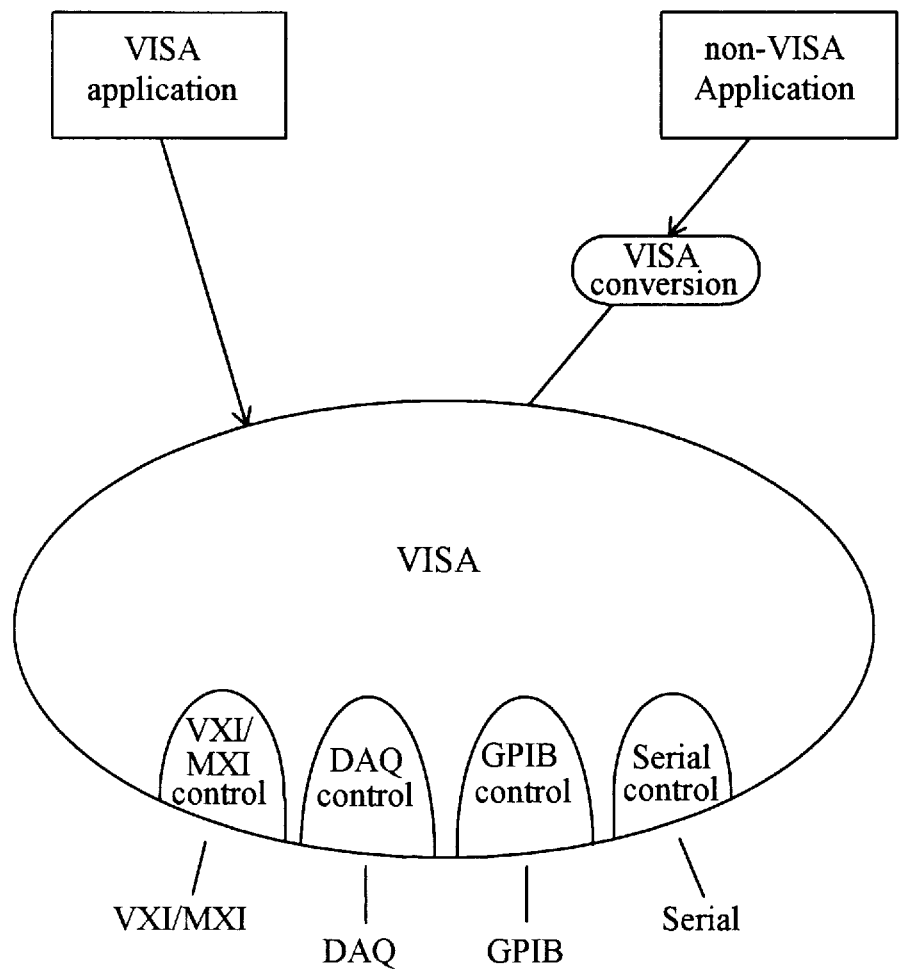
FIG. 5 illustrates the VISA software architecture of the present invention.

The present invention comprises a system and method for controlling an instrumentation system. In the present disclosure, the present invention is based on a software architecture referred to as the Virtual Instrument Software Architecture (VISA), and a system developed according to the present invention can be referred to as a VISA system. Referring now to FIG. 5, a diagram illustrating the software architecture of the preferred embodiment of the present invention is shown. As shown, an application or resource created according to the method of the present invention, referred to as a VISA application, interfaces directly to a VISA system which in turn interfaces directly to hardware. FIG. 5 also illustrates the manner in which a non-VISA application, i.e., a software application which was not developed according to the system and method of the present invention, interfaces to a VISA system through a VISA conversion method or mapping library. A non-VISA application can comprise an application developed to conform to other driver level software standards, including NI-VXI, NI-488, and NI-DAQ from National Instruments Corp., or the Standard Instrument Control Library (SICL) from Hewlett-Packard, among others.

The Virtual Instrument Software Architecture (VISA) utilizes a device resource independence model which involves breaking a device down into its individual, non-overlapping (orthogonal) capabilities. VISA also uses object oriented concepts to simplify the creation of higher level applications. In VISA, the individual capabilities of devices are broken down into a plurality of objects called resources, and these resources are then used to develop instrument drivers or instrument control applications. The device resource independence model and its object oriented nature enable VISA to be independent of I/O interface type, operating system, and programming language. Thus VISA provides a single I/O interface or library which enables a user to control all types of instruments using any of the various types of I/O interfaces.

Due to its object oriented nature, VISA can operate transparently in distributed environments. In other words, the object oriented nature of VISA provides a direct mechanism for the distribution of I/O control software modules across any type of network. Also, the programming model of VISA is the same regardless of the location of a piece of VISA I/O control software and/or the location of the corresponding instrumentation hardware that the software controls. Further, the object oriented nature VISA allows a user to use the objects or resources provided to construct higher level resources, such as instrument drivers and/or applications software, as desired.

In a VISA system, a resource class generally is a definition of a particular capability of a device (such as read, write, trigger, etc.) or a combination of capabilities of a device (INSTR). A resource class is also the specific definition of how to create a resource, i.e., a template for the creation of resources. Each resource can have a set of characteristics called attributes associated with it. For example, an individual GPIB write port resource would have an attribute of End of Transfer Mode (send EOI with the last byte of the transfer) while a VXI interrupt resource would have an attribute of enabled/disabled for reception.

A resource is a particular implementation or instance of a resource class that controls a specific device functionality. Thus a resource is a particular implementation (or "instance" in object-oriented terms) of a resource class. More particularly, a resource is the particular instance of an instrument control resource class for a specific capability of a specific device in the system (e.g. a GPIB read port of a GPIB device at primary address 5). In a VISA system, a resource is defined as the smallest, logical, divisible capability of an instrumentation device controllable through its external connections. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource. A resource may also comprise a combination of two or more resources to represent functionality of a device such as an instrument.

Resources fall into one of two general types, these being a basic resource and a compound resource. A basic resource is a wholly contained software module that does not require other resources for operation. A compound resource is a software module that utilizes one or more basic and/or compound resources to provide a higher level of operation.

A resource comprises three elements: a set of attributes associated with the resource, a set of events that are asynchronously received by the resource, and a set of operations that control the resource. For example, a commander read port for a device might have attributes such as end of string character, timeout value, and protocol; one event might be a user abort; the only operation other than basic template operations would be a read operation (with parameters of a buffer and a number of bytes to transfer).

An attribute is a value within a resource which reflects a characteristic of the operational state of the resource. A user's application reads an attribute value to determine the current state of the resource, for example, how the resource is processing an operation, or how the resource should operate when something occurs. A user application sets an attribute to change the way in which the resource operates. For example, if a user's application desires to use a write resource and wants to use a direct memory access (DMA) method, the user's application would set the attribute transfer mode to DMA and then perform the write operation. In this manner, an attribute changes the characteristics in which a resource operates.

An event object is an asynchronous occurrence that can arrive independently of normal sequential execution of the process running in a system. Examples of events include, but are not limited to, items such as hardware interrupts, exceptions, triggers, signals, and system messages (i.e., a system failure notification). The events that can occur in a VISA system include events that are received by only a single resource and events that can affect more than one resource. In a VISA system, events allow information exchange.

An operation is an action defined by a response that can be performed on a resource, and operations are the primary method of communication among resources and between applications. After a session is established between an application and a resource, the application can communicate with the resource by invoking operations on the resource. Each resource describes the operations which it supports (which are described further below) and the resource and the application exchange information through the parameters of the operations.

A session object designates a communication channel between a user's application and a resource. In other words, a session object is a communication channel that binds an application and a resource. A session describes and implements the behavior of individual connections to resources. In essence, a session object is an instance of a session class, much the same way a resource is an instance of a resource class. Resources can have multiple sessions open to them. In addition, a resource can control one or more other resources.

VISA System

Figure 6:
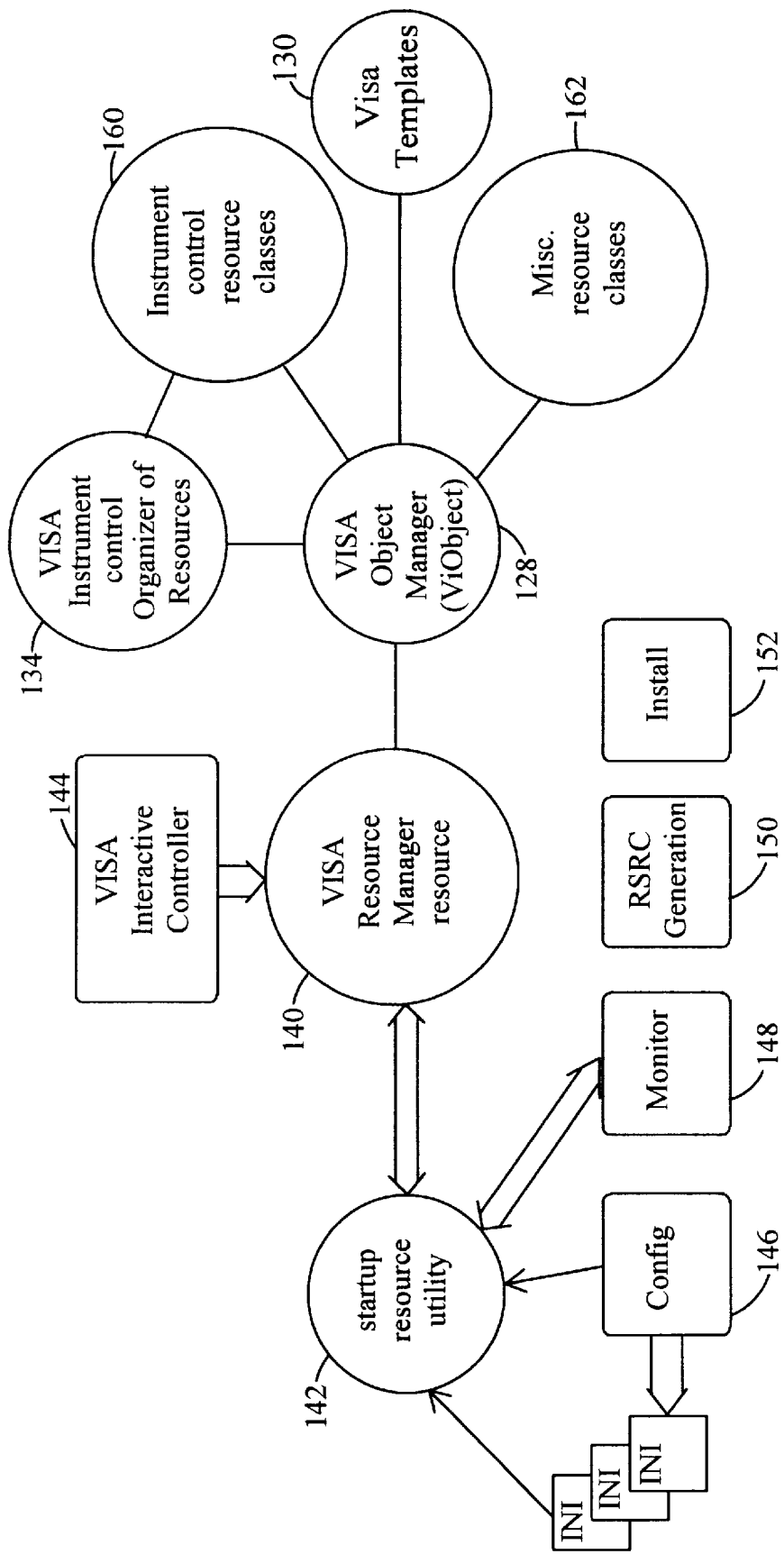
FIG. 6 illustrates the components of a VISA system according to the present invention.

Referring now to FIG. 6, the various elements comprising the preferred embodiment of the present invention are shown, including various utilities for installation and configuration. Each of these elements are preferably software elements stored in the memory 103 of the computer system. As shown, a VISA system includes a VISA Object Manager 128, VISA Templates 130, a VISA Resource Manager 140, which acts as the primary or runtime resource manager, a startup resource utility 142, a VISA interactive controller 144, a configuration utility 146, a monitor utility 148, a resource generation utility 150, and an install utility 152. In addition, an instrumentation system according to the present invention includes a plurality of instrument control resource classes 160 as well as other resource classes 162, as desired, which preferably incorporate their interface from one or more of the VISA Templates 130. The present invention may further include a VISA Instrument Control Organizer (VICO) resource 134 that incorporates its interface from one or more of the VISA Templates 130 and can be used to control the instrument control resource classes 160.

The instrument control resources 160 and other resources 162 act as building blocks for user applications. In the present disclosure the term "user" is intended to include a client which uses the available resources to create client applications as well as a developer who either uses or incorporates the available resources to develop new, possibly higher level, resources. It is noted that the present invention can include one or more additional runtime resource managers as well as additional groupings of resource classes for additional functionality, as desired.

Instrument Control Resource Classes

The instrument control resource classes comprise resource classes for controlling GPIB, VXI, and serial instruments as well as data acquisition boards. The instrument control resource classes can be logically partitioned into common resource classes and device-specific resource classes. Common resource classes are those class definitions that have some commonality with one or more types of devices (e.g. both GPIB and VXI or both VXI and a trigger board) or that can be defined in a manner such that the resource class is independent of the device with which it is communicating (e.g. formatted I/O). Device-specific or interface-specific resource classes (also called hardware-specific classes) are those resource classes that have no commonality with other types of resource classes and are used to control device and/or interface level features specifically for a single type of device Device-specific resources class are required where the capabilities of the bus or connection to the device cannot be separated from the undivided device. An example is the Interface clear line on the GPIB bus, which is a line that is bussed across the entire GPIB bus and thus affects other devices. The resource classes 162 may comprise classes for process control, among others.

VISA Object Manager

The VISA Object Manager 128 provides capabilities to control and manage objects, wherein an object is an instance of a class. The VISA Object Manager 128 includes important capabilities such as registration of interface definitions, creation and destruction of objects, characteristic control, and operation invocation. Thus, the VISA Object Manager 128 includes a service used to register interface descriptions for classes of objects, and thus maintains an interface repository. The VISA Object Manager also provides life cycle services used by a client application to create and destroy objects. The life cycle services are also used to free up associated system resources when a client uninitializes an environment. The characteristic control services are provided by an object to get or set values of an attribute if that attribute is exported by an object. The operation invocation services are used to allow objects to communicate with one another by invoking operations. Operations can be invoked on other objects within a given computer system across a distributed system or network. The operation invocation service also provides mechanisms to report the completion status of operations. A VISA system preferably uses a CORBA 2 (Common Object Request Broker Architecture) object broker, such as the System Object Model (SOM) object management environment. Alternatively, a VISA system uses an OLE/COM object request broker.

The VISA Object Manager comprises an object management environment and also includes a basic class definition referred to as the ViObject class. The ViObject class is the most basic object in a VISA system and all other classes in VISA inherit functionality from the ViObject class and are derived either directly or indirectly from the ViObject class. The ViObject class contains operations for object destruction and characteristic control. An object is created using a function referred to as viOpenObject. For more information on the VISA Object Manager refer to Appendix 1, which is incorporated herein by reference as though fully set forth herein.

The ViObject class supports attributes, i.e., viGetAttribute and viSetAttribute and closing, i.e., viClose and terminating objects, i.e., viTerminate.

VISA Templates

The present invention includes a plurality of VISA Templates which include ViResource, ViSession, ViEvent, and ViEvent Filter classes. The VISA Templates inherit from ViObject and define an interface including a well-defined set of services that are used by all resources. Each VISA resource derives its interface from the VISA Template set that provides standard services for the resource. This increases the ability to revise, test and maintain the resource.

The VISA templates define a set of control services including session termination control (extended life cycle control), local/global attribute management services (extended characteristic control), allowing or disallowing access to a particular resource (access control), and basic communications services, including operation invocation and event reporting. As noted above, a VISA system according to the present invention defines an architecture comprising a plurality of resources which encapsulate device functionality. Each resource provides specialized services to applications or to other resources. The VISA system of the present invention maintains a high level of consistency and extensibility in the operation of VISA resources. This consistency and extensibility are achieved through the VISA templates.

As noted above, the VISA Templates also define various communications services among resources and between applications and resources. The two methods of communication among resources and between applications are operation invocation, i.e., invoking operations on a resource, and the exchange of information through events. After establishing a session to a resource, an application can communicate with the resource by invoking operations on the resource. These operations include the operations defined in the respective VISA Templates as well as the operations supported by the particular resource. The resource and application exchange information through the parameters of the operations. The VISA Templates also define event reporting, including callbacks, queuing, and waiting services for resources during system events, exceptions, and resource defined events.

The ViSession class provides most of the implementation of the template interface available to the user, including the communication services (operation invocation), the characteristic control services (attributes), and life cycle services (creating and destroying objects) as derived from ViObject. In addition, the ViSession class introduces the access control services (locking), and extends the communication services provided by ViObject by introducing event-based communication.

The ViResource class also derives from the ViObject services and adds life cycle control of sessions. Through the life cycle service of ViResource, users can create new sessions using the viOpenSession( ) operation. It is noted that this session operation is not available to user applications, although user applications can open sessions indirectly through the resource manager. In addition to providing life cycle control of sessions, the ViResource class also acts as a global storage across all the sessions.

Thus, whereas the services provided by session objects affect only the individual sessions, the ViResource object provides services that can affect multiple sessions or are global to all the sessions of a resource.

VISA Resource Manager

The VISA Resource Manager derives its interface from the ViSession and ViResource classes and one or more of the VISA Templates. The VISA Resource Manager is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources, locating resources (location search), management of session creation, modification and retrieval of resource attributes, operation invocation, event reporting, and access control, among others. The VISA Resource Manager includes an API for these management needs, and all defined resources may use these capabilities. The VISA Resource Manager allows a user to open a session to any resource in the system, including only single device capabilities such as a single trigger line or a single write port on a device.

At startup of the system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operation, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. A developer can create a higher level resource that uses other resources, much the same way that a client uses resources, or the developer can create a higher level resource that incorporates functionality from one or more resources. As an example of a higher level resource, a developer can develop a resource that embodies all of the functionality of a type of instrument, such as a voltmeter. This resource can then be used to control any type of voltmeter using any type of I/O interface.

When VISA is implemented in the C++ programming language, a resource class and a session class are preferably implemented as C++ classes. A resource instance or resource and a session instance or session are implemented in C++ as instances of the class. A resource preferably includes references to global data that are global to the session. A session instance maintains a reference to local data that is local to the session.

As discussed above, a session object designates a communication channel between a user's application and a resource. A function call or operation on the VISA Resource Manager 140 referred to as ViOpen instructs the VISA Resource Manager 140 to create a session between a resource and a user's application, which may also be a resource. In many instances it is desirable for more than one application to be able to control an instrument. In these instances it is necessary to have more than one communication channel to the respective resource that controls the respective capability of the instrument. The session is the mechanism used to project the interface for a resource out to the user application. Thus, a session is a communication channel that binds an application and a resource. In essence, a session is an instance of a resource, much the same way a resource is an instance of a resource class. Resources can have multiple sessions open to them. In addition, a resource can control one or more other resources. The VISA Resource Manager 140 allows a user to open a session to any resource in the system, including single device capabilities such as a single trigger line or a single write port on a device.

VICO

In one embodiment of the invention, a VISA system includes a resource referred to as the VISA Instrument Control Organizer (VICO) 134 which allows for the creation of user-defined resource groupings (virtual instruments). A virtual instrument, in this context, refers to a unique session to a resource to provide the functionality of a traditional, stand-alone instrument. The VICO 134 is included in this embodiment to provide a higher level user interface so that users can communicate with instrumentation at a higher level of abstraction. The VICO 134 is a resource similar to other resources in the system. VICO 134 is unique, however, in the sense that it serves only one unique service specifically for instrument control resources. With VICO 134, applications can create sessions that can communicate with any number and type of Instrument control resources. In other words, a single VICO session can control all aspects of one or more complete devices. Thus VICO 134 encapsulates features of the resources for users who require a simple interface.

Utilities

The startup resource utility 142 registers and unregisters resources with the VISA Resource Manager 140 at startup, monitors VISA Resource Manager events, and provides the capability to monitor resources and events. The resource monitor utility 148 monitors the resources that are registered to the VISA Resource Manager 140 and also monitors active instantiations of resources to the VISA Resource Manager 140. The resource monitor 148 also monitors for specific events occurring in the VISA Resource Manager 140, and maintains a log or history of user specified VISA actions. The configuration utility 146 operates to modify default attributes for resources as directed by a user, as well as modify information needed by the resource to find the hardware. The configuration utility 146 also notifies the resource manager of new resources in the system, creates aliases for groupings of resources, and informs the resource manager of these aliases.

The VISA interactive control utility 144 interactively and dynamically finds resources and executes methods of those resources. The VISA interactive control utility 144 also simulates VISA actions/events. It is noted that the capabilities of this utility are derived from the VISA application programming interface. The resource generation utility generates a resource usable by the configuration utility and the resource manager utility from a user defined set of entry points and structures. All of the above utilities preferably interact to provide a high level of integration between the individual components. It should be noted also that most of the description of the individual resources is provide through the interface description language specification, from which each resource is clearly and uniquely described. This information, along with the registration information provided to the resource manager, forms the basis for the configurability and interactivity of the system. The Install utility 152 provides a common look and feel to installation of components within the VISA system.

Example VISA System

Figure 7:
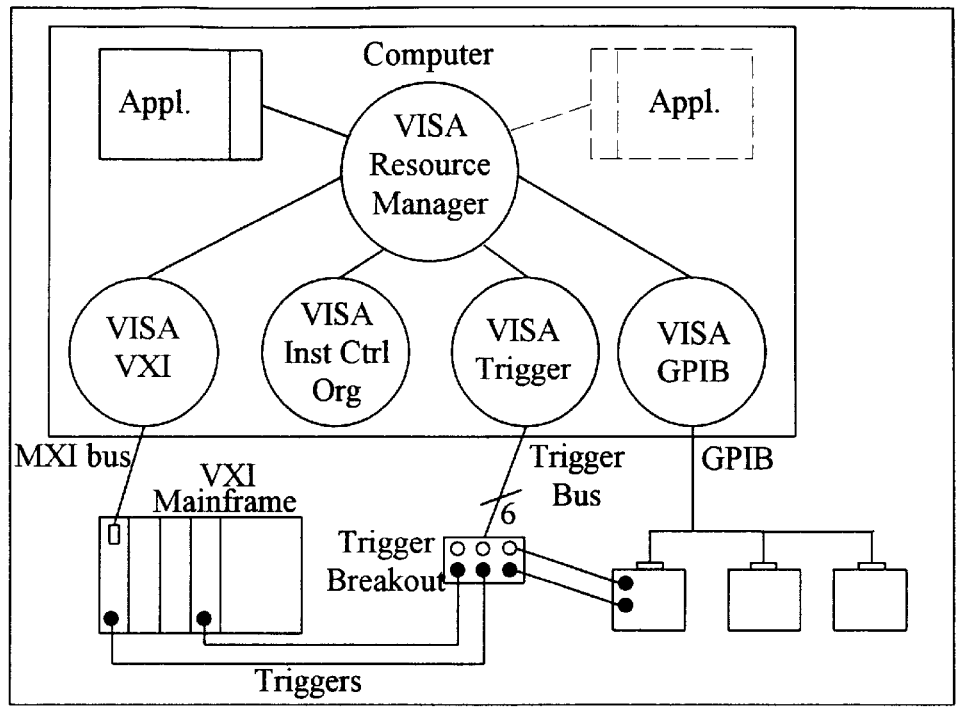
FIGS. 7 and 8 illustrate two examples of a VISA instrumentation system in a non-distributed and distributed environment, respectively.
Figure 8:
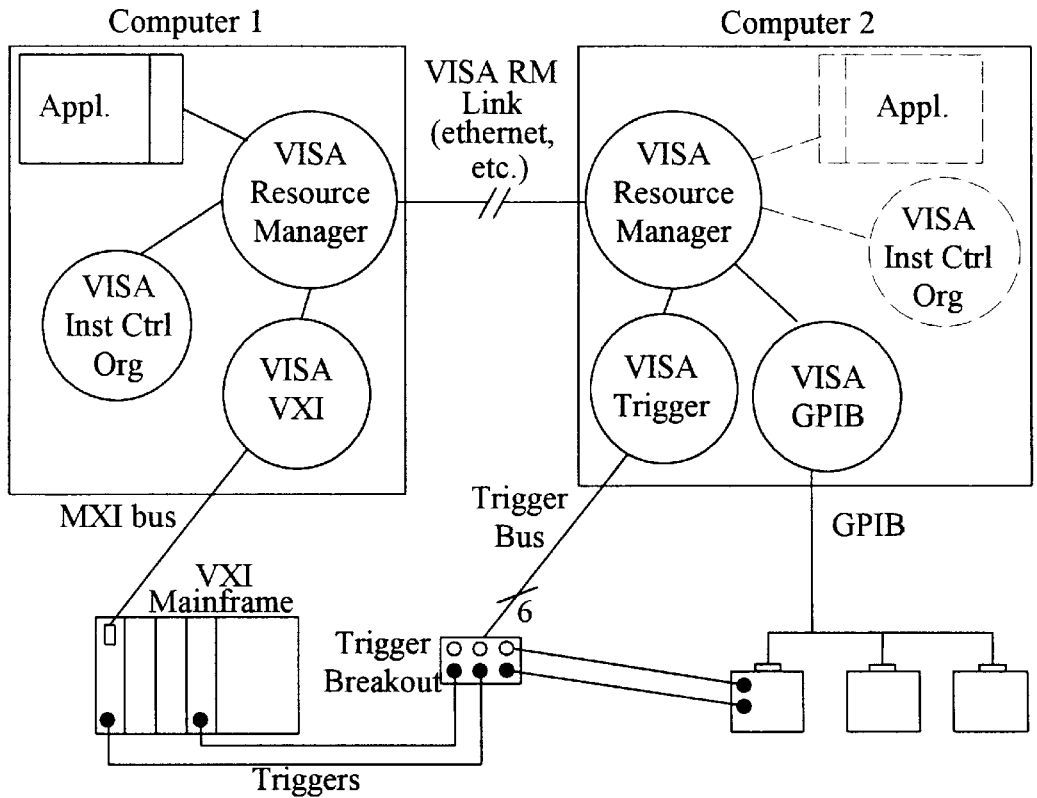

Referring now to FIGS. 7 and 8, block diagrams illustrating various embodiments of a VISA system of the present invention are disclosed. FIG. 7 shows a VISA system where one or more applications control various resources, such as a VXI resource, a trigger resource, and a GPIB resource through the VISA Resource Manager 140. The applications also use the VICO 134 to aid in the creation and use of these resources. As shown, the VXI resource controls the VXI mainframe through a MXI bus. The trigger resource controls a trigger breakout device through a trigger bus and the GPIB resource controls one or more GPIB instruments through the GPIB bus.

FIG. 8 illustrates an embodiment of a VISA system according to the present invention in a distributed environment. As discussed further below, the device resource independent and object oriented nature of the present invention allows for the method of the present invention to be readily adapted to distributed environments. FIG. 8 illustrates an embodiment where two or more computers in different physical locations are used to control a single instrumentation system. As shown, computer 1 includes an application which controls one or more resources. As shown, the application controls a VXI resource and VICO 134 through the VISA Resource Manager 140. Computer 2 includes an application that also controls one or more resources through a second VISA Resource Manager 140, in this example, a trigger resource and a GPIB resource, as well as VICO 134. Computer 1 communicates with computer 2 through a VISA Resource Manager link such as a network connection such as Ethernet. As shown in Computer 2, the dashed lines around VICO 134 and the application indicate that the application and VICO 134 are not necessary in computer 2, and the application in conjunction with the VISA Resource Manager 140 in computer 1 can control all of the resources and the VISA Resource Manager 140 in computer 2, as desired.

Resource Classes

Figure 9:
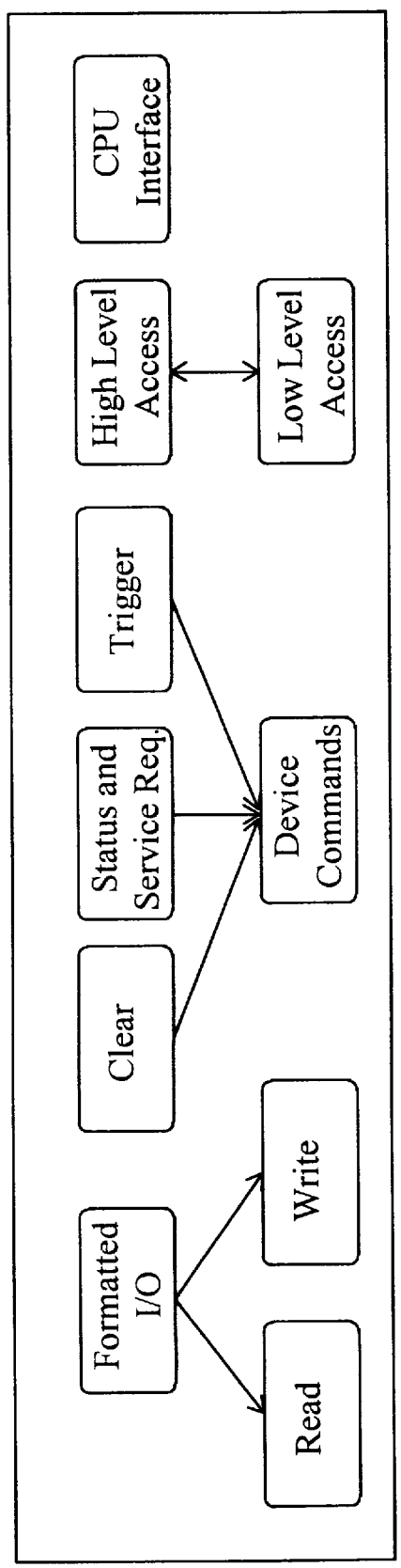
FIG. 9 illustrates the common instrument control resource classes according to one embodiment of the invention.
Figure 10:
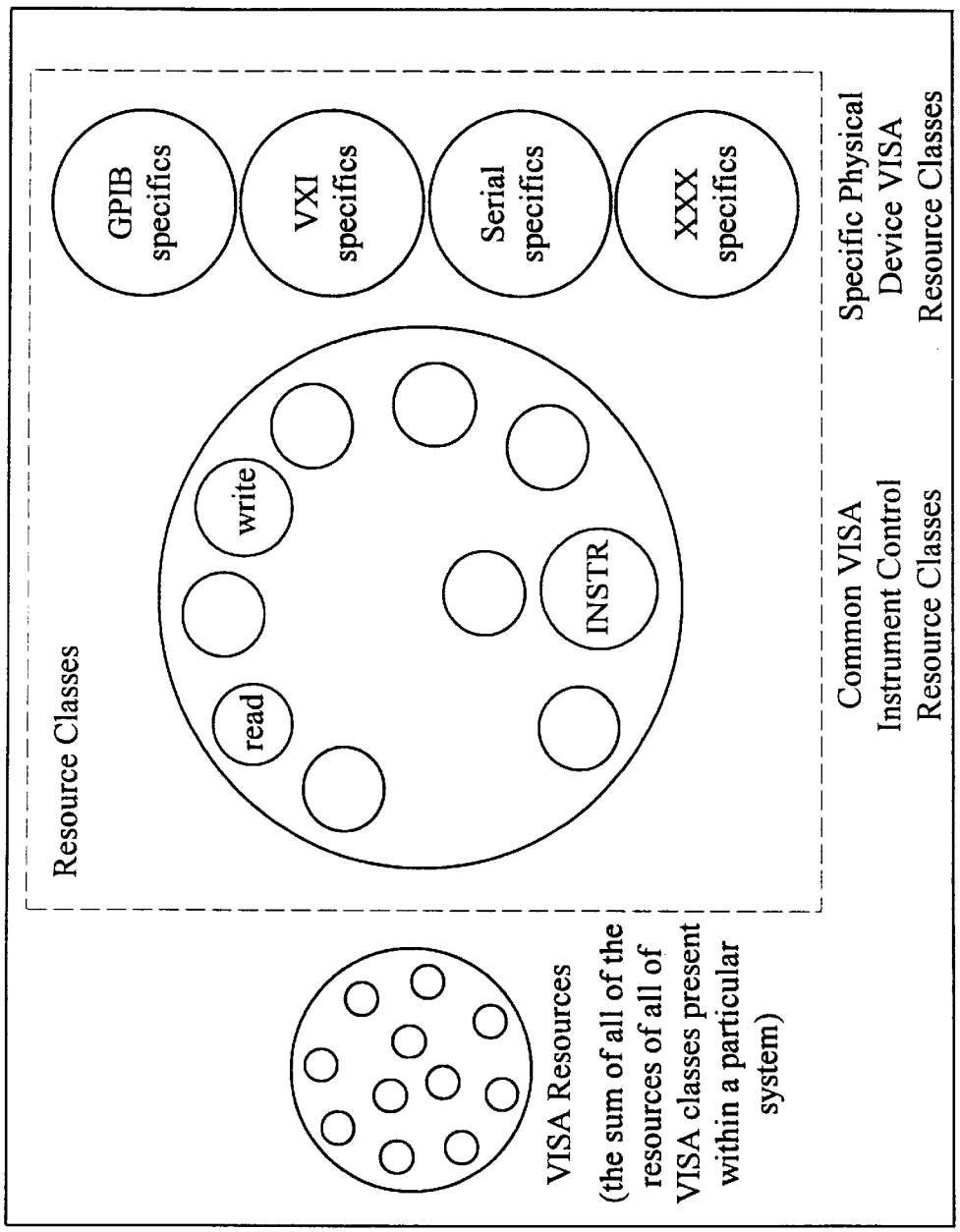
FIG. 10 illustrates the common instrument control resource classes and specific physical device VISA resource classes and corresponding VISA resources.
Figure 12:
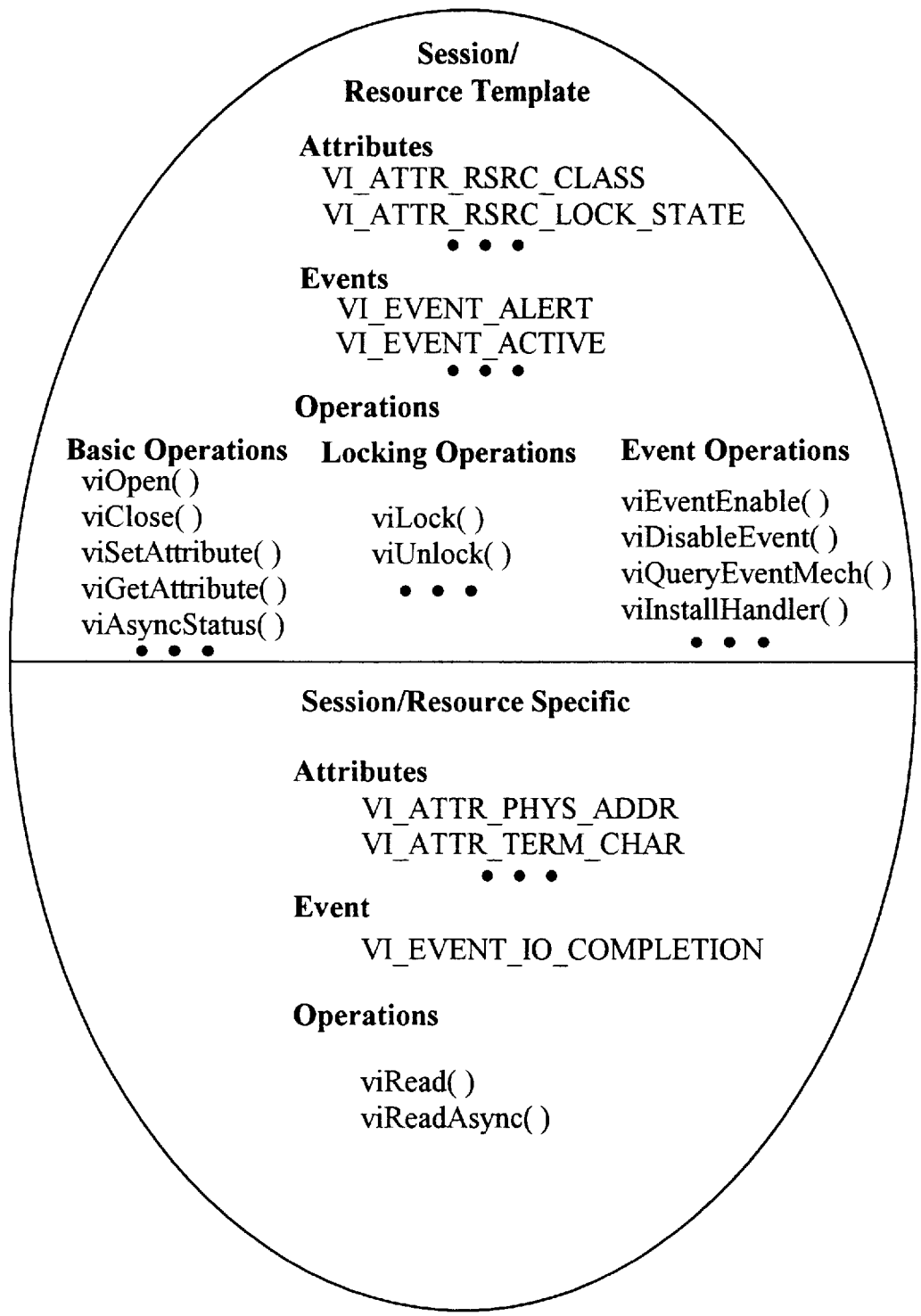
FIG. 12 illustrates the organization of an instrument control resource class.

FIGS. 9 and 10 illustrate the resource classes comprised in the instrument resource classes block 160. The instrument control resource classes 160 are provided to encapsulate the various operations of a device, including read, write, trigger, and so on. A VISA instrument control resource, is defined by the basic operations, attributes, and events of the ViObject class and one or more of the VISA Templates. The instrument control resource classes 160 provide certain operations included in one or more of the VISA Templates 130. As shown in FIG. 12, from the basic interface of one or more of the VISA Templates, i.e., this basic set of attributes, events, and operations, each resource class adds its specific operations, attributes and events, which allow the class to act as a template for resources which perform the dedicated task of the class, such as sending a string to a message-based device.

FIG. 9 illustrates the common resource classes in one embodiment, these being: Formatted I/O, Read, Write, Clear, Status and Service Request, Trigger, Device Commands, High Level Access, Low Level Access, and CPU Interface. FIG. 9 also shows the hierarchy or relationship of the common instrument control classes. As shown, the Formatted I/O resource class relies on the Read and Write resource classes for its operation. Thus, when a resource from the Formatted I/O resource class is instantiated, the resource opens sessions to the appropriate Read and Write resources. Likewise, the Clear, Status and Service Request, and Trigger resource classes rely on the Device Commands resource class for their operation. The High Level Access resource class relies on the Low Level Access resource class for its operation. Some resources, such as the CPU Interface resource, have no inter-relation with any other instrument control resource. This does not imply that the resource cannot be used with the other resources, but that it does not use, and is not used by, any other instrument control resource.

FIG. 10 illustrates an example resource class comprised in a VISA system. A VISA resource can implement its functionality directly, such as reading data off the bus, or can create sessions to other resources, which may include calling the parent class to implement the desired functionality. FIG. 10 also shows that the sum of all the VISA instrument control resource classes is comprised of the common instrument control resource classes and the specific device (interface or hardware specific) instrument control resource classes. As shown, the specific physical device resource classes include GPIB specific, VXI specific, and serial specific resource classes.

Figure 11:
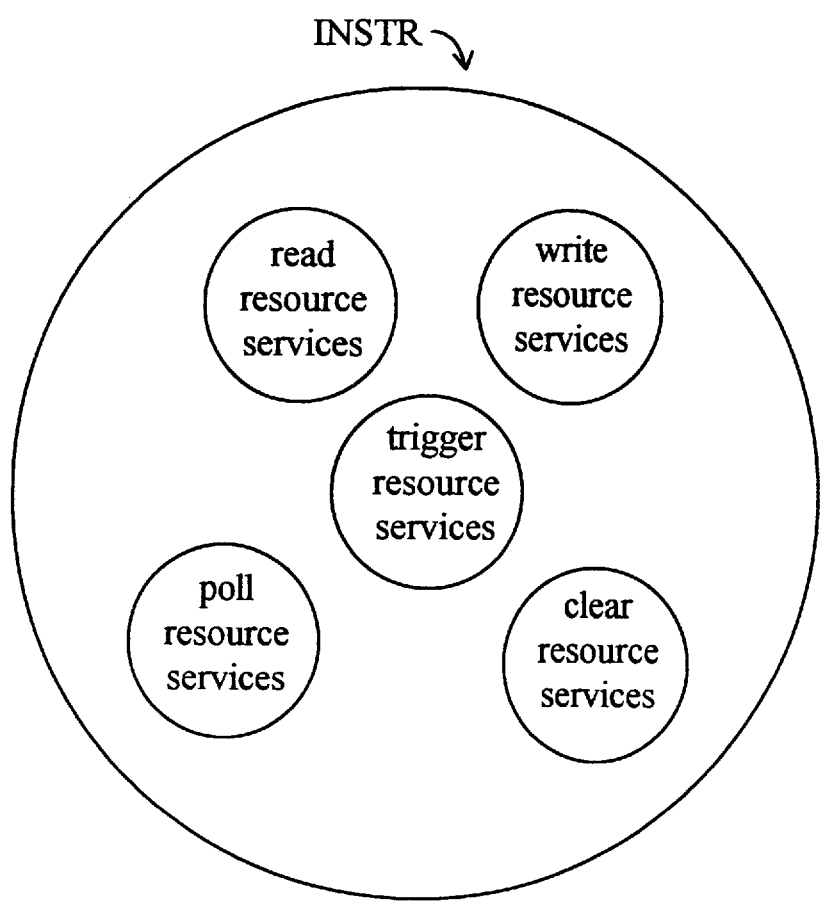
FIG. 11 illustrates an INSTR resource according to the preferred embodiment of the invention.

Referring now to FIG. 11, in the preferred embodiment a VISA system includes a resource class referred to as INSTR. The INSTR resource is an abstraction which includes different resources for different types of instruments. For example, an INSTR resource for a register-based device preferably only includes High Level and Low Level accesses, while an INSTR resource for a GPIB device preferably only includes read, write, trigger, poll and clear resources. An INSTR resource for a message-based VXI device preferably includes read, write, trigger, poll and clear resources in addition to High Level and Low Level resources. FIG. 11 illustrates an INSTR resource which includes read, write, trigger, poll and clear resource services.

Figure 11A:
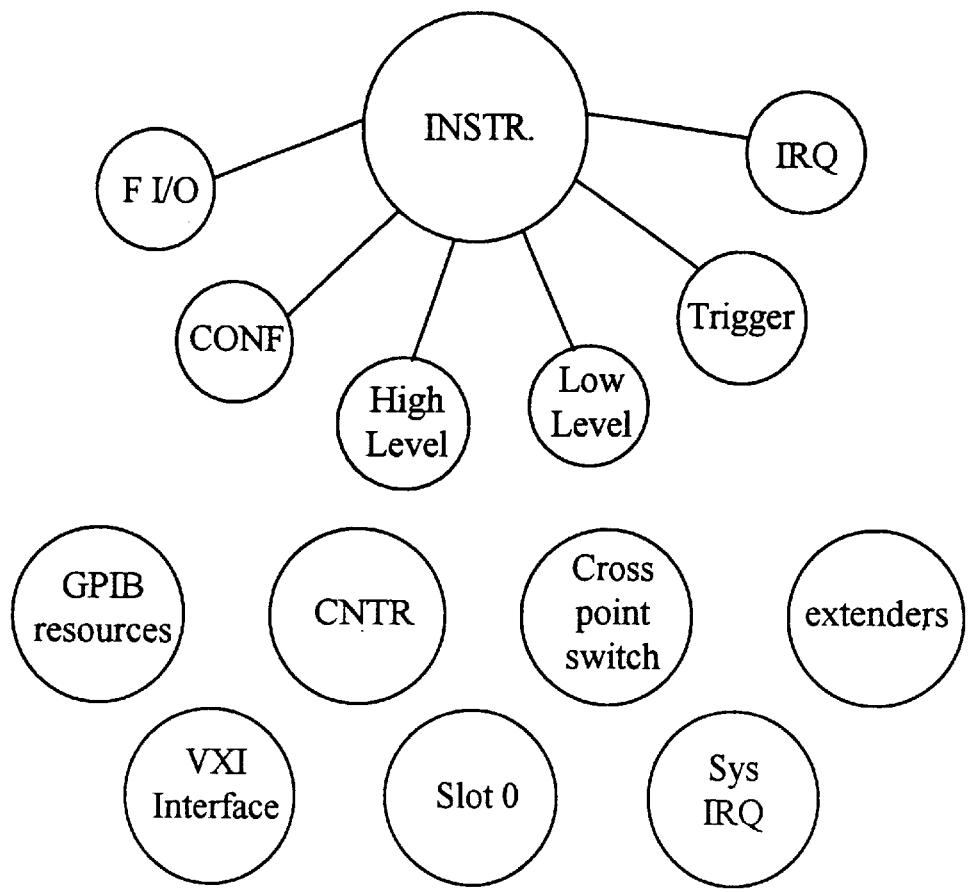
Figures 11A–11C illustrate the relationship of the INSTR resource to other resources in the system.

FIG. 11A illustrates that the INSTR resource may use one or more of the Formatted I/O, Configuration, High Level, Low Level, Trigger, and IRQ resources. FIG. 11A also illustrates various "stand-alone" resources, including GPIB resources, a Counter (CNTR) resource, a Cross-Point Switch (CPS) resource, an extenders resources, a VXI Interface resource, a Slot 0 resource, and a System IRQ resource.

Figure 11B:
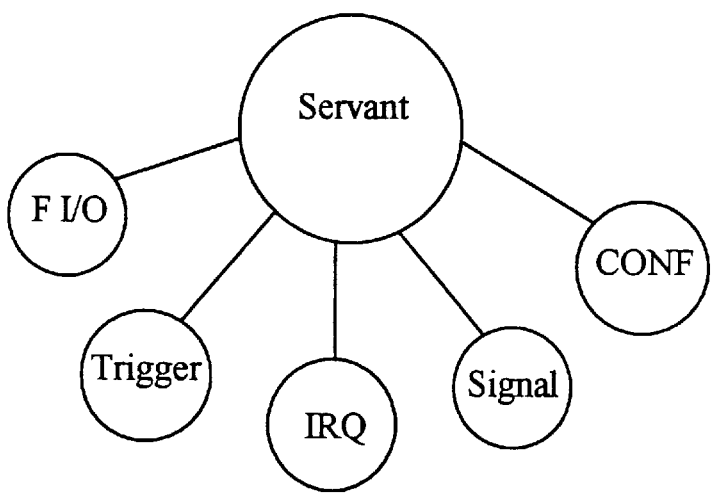

FIG. 11B illustrates a Servant resource which is used by the INSTR resource. As shown, the Servant resource may inherit or derive from the Formatted I/O resource, the Trigger resource, the IRQ resource, the Signal resource, and the Configuration resource.

Figure 11C:
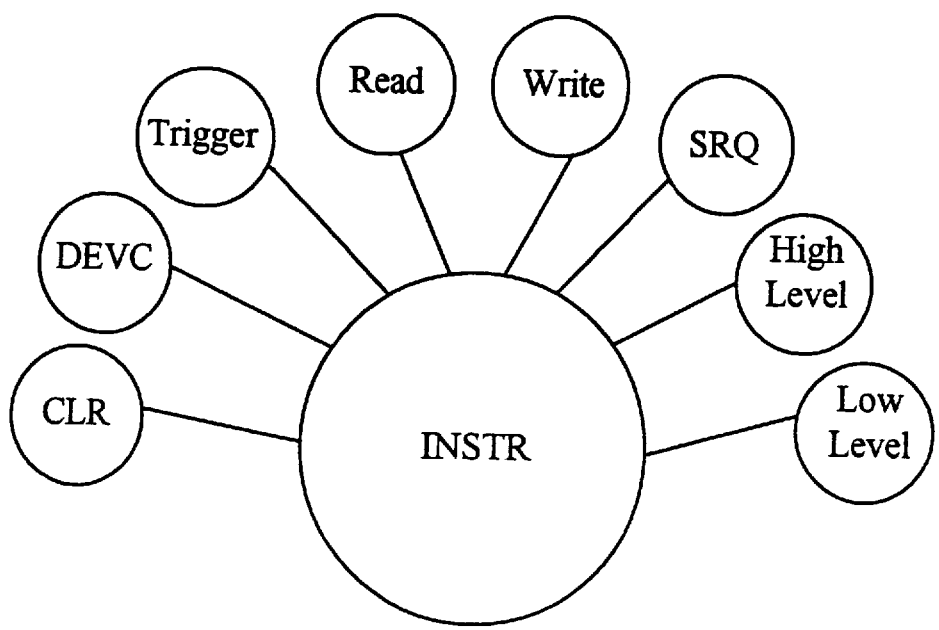

FIG. 11C illustrates the manner in which the INSTR resource may present an interface of other resources, including the read resource, write resource, clear resource. Device Clear (DevC) resource, Trigger resource, service request (SRQ) resource. High Level resource, and Low Level resource. As shown, the Formatted I/O resource interface appears through the read or write resources, which in turn are extensions of the INSTR resource.

The instrument control resource classes according to one embodiment are discussed in detail in Appendix 1 of U.S. patent application Ser. No. 08/238,480, previously referenced and incorporated by reference herein in its entirety. As shown in Appendix 1 of the patent application referenced above, each of the instrument control resource classes include a number of attributes, operations, and events for implementing respective capabilities of instruments. The instrument control resource classes in a VISA system according to the preferred embodiment are listed in Appendix 1 to the present application.

Referring now to FIG. 12, a diagram illustrating the organization of one of the instrument control resources 160 is shown. As previously noted, each of the instrument control resources 160, derive functionality from one or more of the VISA Resource Templates. FIG. 12 illustrates the manner in which each instrument control resource 160 includes a portion (upper portion) that derives its interface from one of the one or more VISA Resource Templates, and a portion (lower portion) that comprises an interface that is specific to that particular resource.

Figure 13:
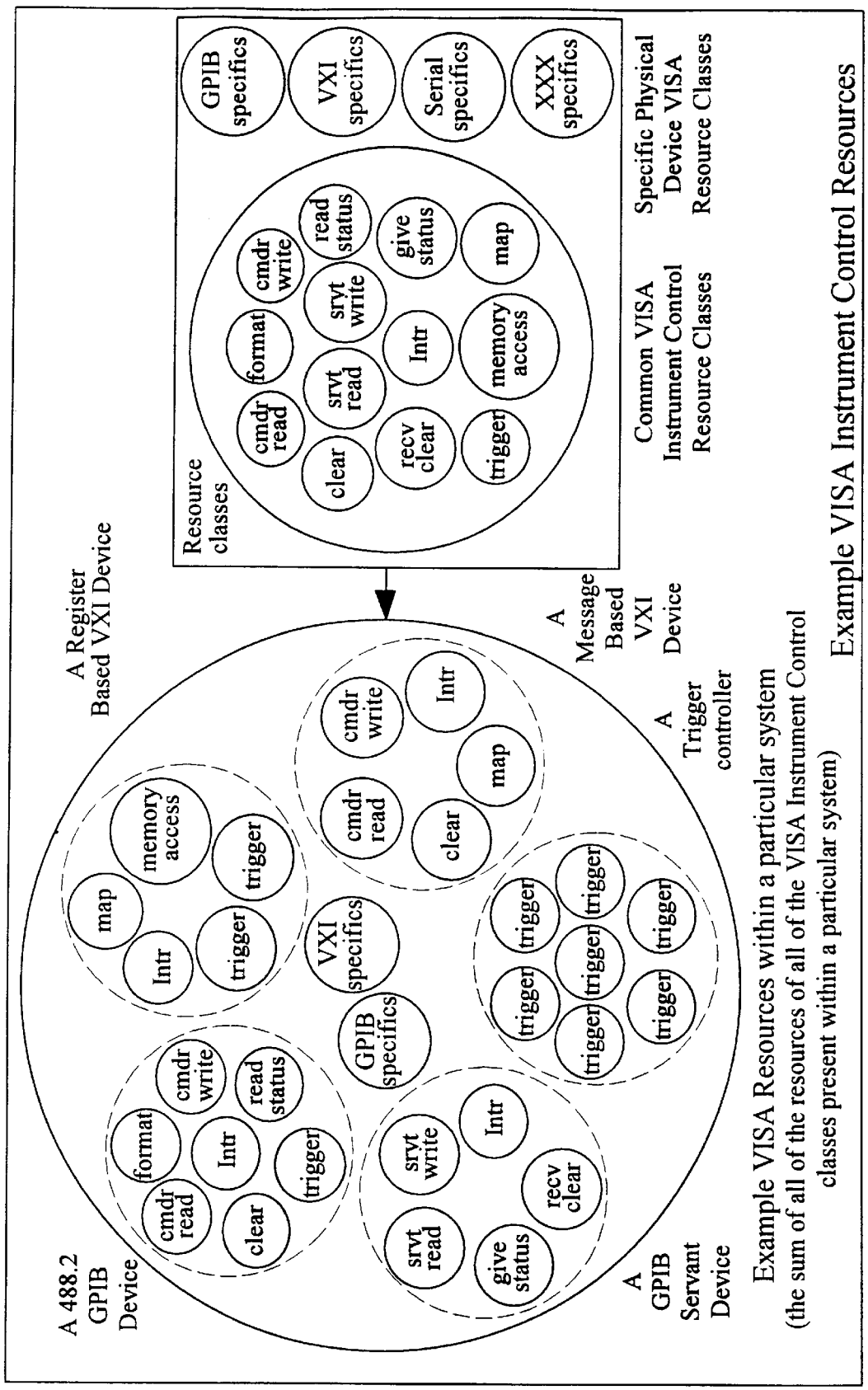
FIG. 13 illustrates example VISA instrument control resources.

FIG. 13 shows an example of the resources that might be created when a system has been powered up and in use. The resources in this example are based loosely on the example configuration shown in FIGS. 7 and 8. In this example, resources are created for the VXI system, the GPIB system, and the trigger controller. It is noted that only the device capabilities that each device has are reflected in the set of resources in the system. It is also noted that the medium size circles are provided around groupings of resources simply as a visual grouping organization, and these circles are not intended to connote any meaning regarding system operation or usage of resources. From the standpoint of the VISA Resource Manager, each resource in the system is treated exactly the same.

VISA System Operation

Figure 14:
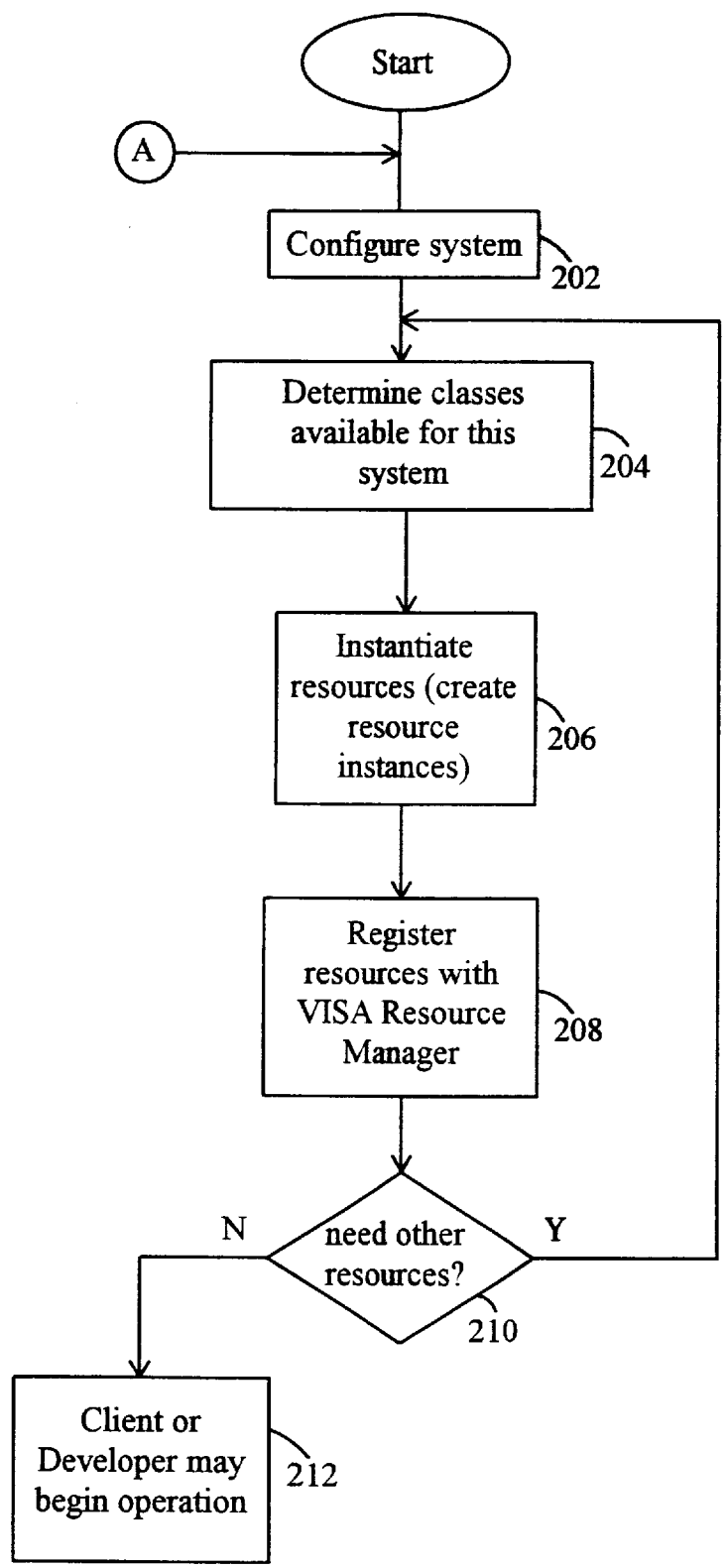
FIG. 14 is a flowchart diagram illustrating the configuration steps performed by a VISA system.
Figures 15, 16:
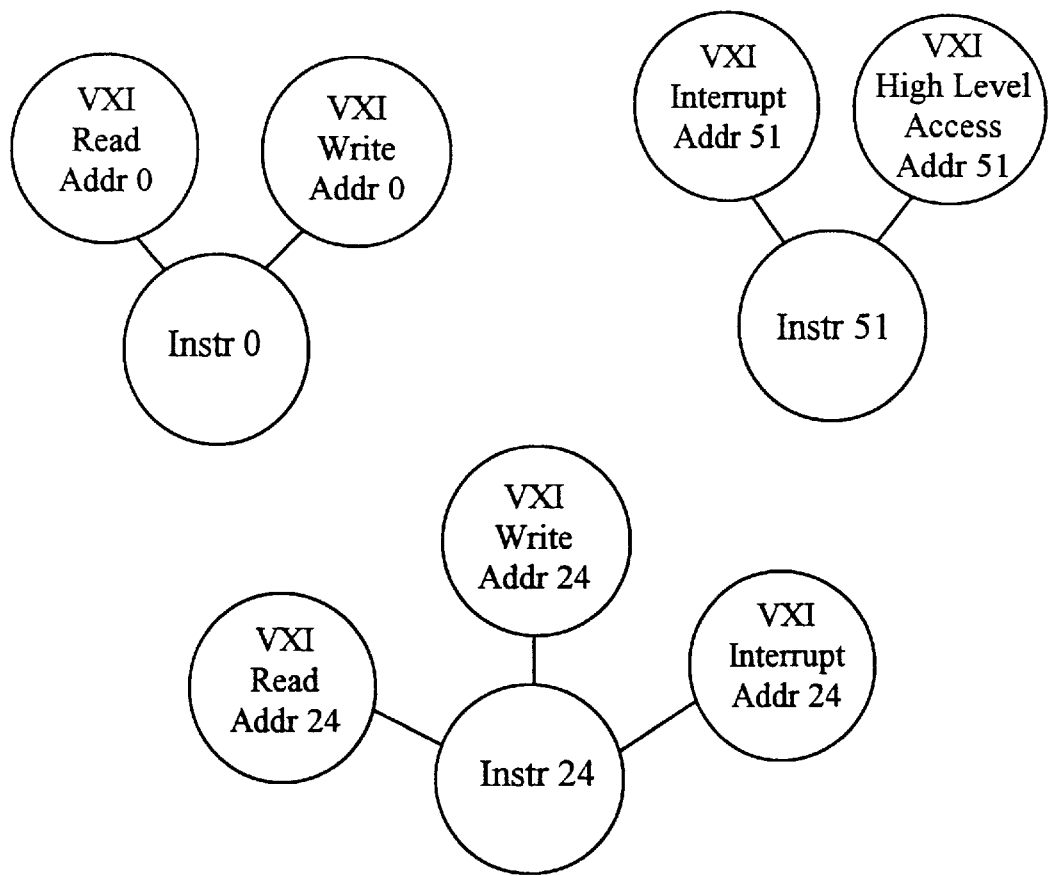
FIG. 15 illustrates an example of instrument devices and resource classes implemented in an example VISA system.
FIG. 16 illustrates the resources created by the configuration method of FIG. 14 for the example VISA system of FIG. 15.

Referring now to FIG. 14, a diagram illustrating operation of the present invention at power up is shown. This operation is described in conjunction with a simple instrumentation system which is shown in FIGS. 15 and 16. As shown in FIG. 15, the example instrumentation system includes a VXI chassis including a CPU card, a message based device card and a register based device card. The CPU card has an address of 0, the message based device has an address of 24, and the register based device has an address of 51. The resource classes available in this example are Read, Write, High Level Access, and VXIbus Interrupt.

Referring again to FIG. 14, in step 202 a method is invoked which configures the instrumentation system. This method involves determining the respective hardware and instruments available within the system as well as determining the logical address of the respective instruments in this system. In the present example, in step 202 the method would determine that there is a VXI CPU card having address 0, a respective message based device having an address of 24, and a respective VXI register based device having an address of 51 comprised within the system. In step 204 the method determines the classes available within the system. In the present example, the method would determine that the classes available are Read, Write, High Level Access, and Interrupt. In step 206 the method uses the classes determined in step 204 and the hardware configuration determined in step 202 to create resources.

Referring now to FIG. 16, a diagram illustrating the resources that are generated in this example are shown. As shown, the resources created include INSTR resources for each of the devices, i.e., each of the addresses. As shown, the INSTR resource for address 0 presents a VXI Read of address 0 and a VXI Write of address 0. The INSTR resource for address 24 presents a VXI Read of address 24, a VXI Write of address 24, and a VXI Interrupt at address 24. The INSTR resource for address 51 presents a VXI Interrupt at address 51 and a High Level Access at address 51. Each of these are views of individual INSTR resources to each physical device.

The startup resource utility 142 instantiates or creates these resources in step 206. The step of instantiating or creating resources in step 206 involves creating an instance which includes code that is inherited or incorporated from the class determined in step 204. The example shown in FIG. 15 includes a read resource class. In order to create an instance of that class, for example a VXI read instance, the method creates an instance which inherits from the interface of the read class. The method may also overwrite a portion of this inherited code with new code that actually implements the specific reads for the interface, in this example the VXI interface.

In step 208 the startup resource manager registers these resources with the VISA Resource Manager 140. In other words, the application programming interface of the resource is provided to the VISA Resource Manager 140, and the resource is provided with a unique name or identifier. The registration process comprises providing entry points regarding the resource, including a description of the operations, a description of the attributes, a description of the exit conditions, the location of the files, and a description of the files themselves.

Upon completion of step 208, the method determines in step 210 if other resources are needed to register the resources in step 208 that were created in step 206. Due to the hierarchical nature in which some resources require other resources for operation as discussed above with regard to FIG. 22, it may be necessary for other resources to be created and registered with the VISA Resource Manager 140. If other resources are determined to be necessary in step 210, then operation returns to step 204. If other resources are not required in step 210, then startup operation has completed and operation is turned over to the user.

ViOpen Operation

Figure 17A:
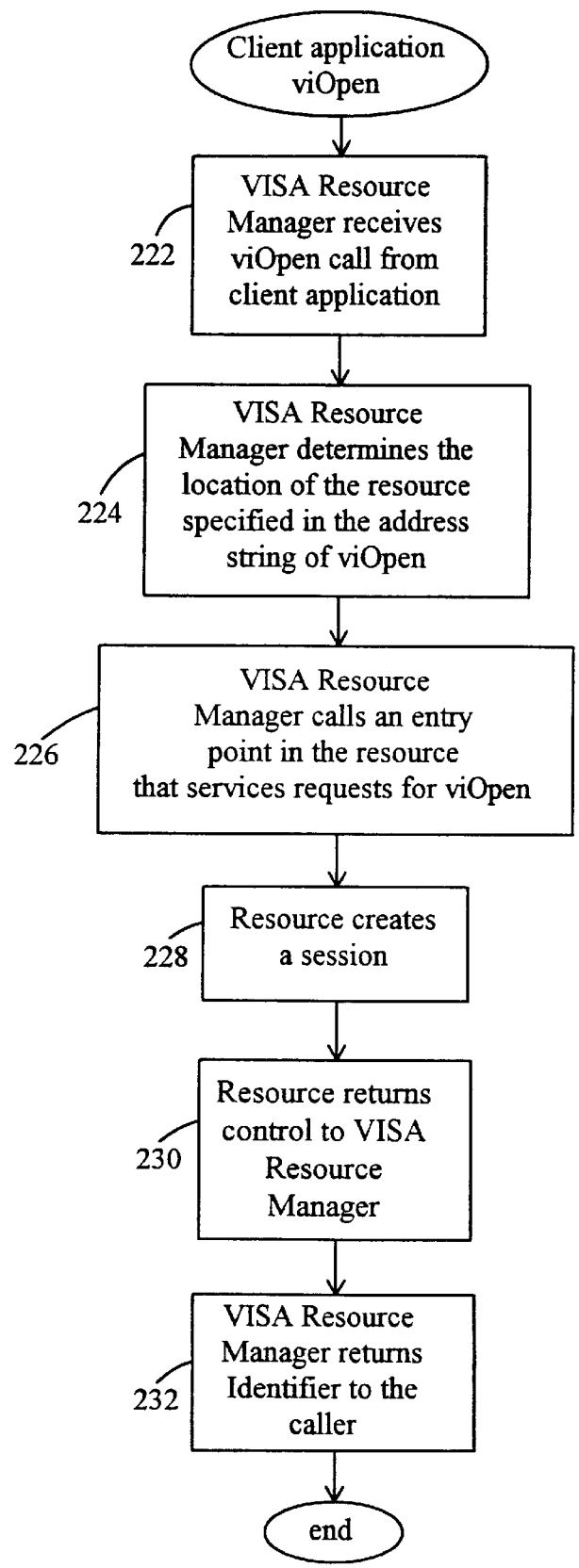
FIG. 17A is a flowchart diagram illustrating the steps performed by a VISA system when a client application uses the ViOpen operation.
Figure 17B:
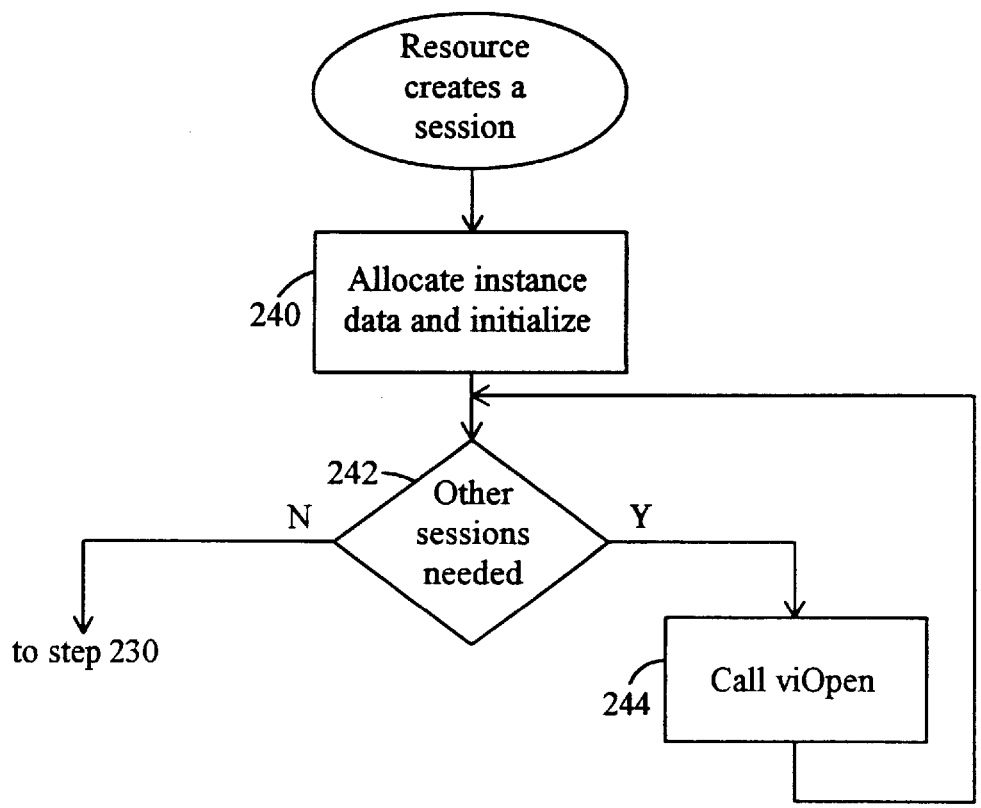
FIG. 17B is a flowchart diagram of a resource creating a session performed in step 228 of FIG. 17A.

FIGS. 17A–B illustrate operation when a client application begins using the resources within a VISA system according to the present invention. Referring now to FIGS. 17A–B, a diagram illustrating operation of a VISA system when a ViOpen instruction is received from a client application is shown. A client begins an application or session with a ViOpen instruction. The ViOpen instruction instructs the VISA Resource Manager 140 to connect the user's application to a desired resource. The operation of the ViOpen operation illustrated in FIG. 17A is discussed in conjunction with FIG. 18.

Figure 18:
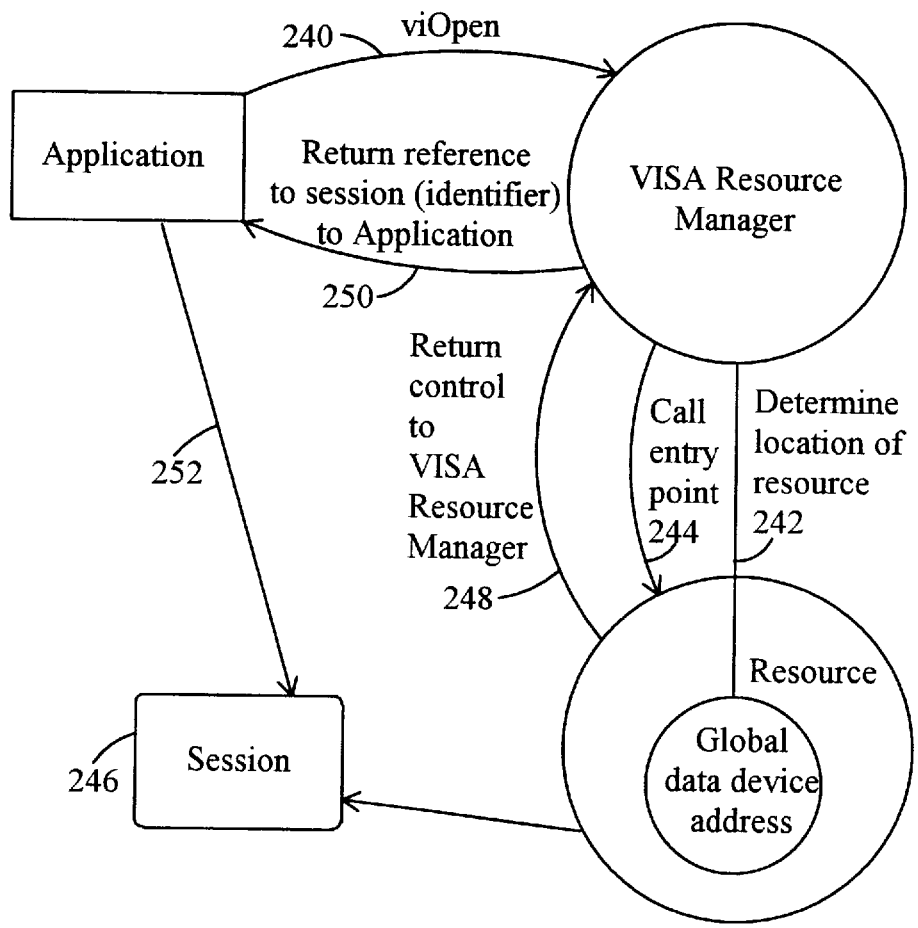
FIG. 18 illustrates the steps performed in FIG. 17A when a ViOpen operation is used.

When a system according to the present invention receives a ViOpen instruction in step 222, then in step 224 the VISA Resource Manager 140 determines the location of the resource specified in the address string of the ViOpen instruction. In FIG. 18, the client application performing a ViOpen operation on VISA Resource Manager is shown at 240, and step 124 where the VISA Resource Manager 140 determines the location of the resource is shown at 242. In step 226 the VISA Resource Manager 140 calls an entry point in the resource that services requests for the ViOpen operation. This step is illustrated at 244 in FIG. 18. In step 228 the resource creates a session, this session being shown at 246 in FIG. 18. As described above, a session is essentially an instance of a resource. Creating a session involves creating data that is needed for a particular instance of that resource.

In step 230 the resource returns control to the VISA Resource Manager 140, and this is shown at 248 in FIG. 18. In step 232 the VISA Resource Manager 140 returns a reference or identifier to the user's application. This reference is provided in the variable "session i.d." to the user application, as shown at 250 in FIG. 18. The application can then use this session i.d. value to communicate with the resource, as shown at 252 in FIG. 18.

FIG. 17B illustrates more detail regarding how a resource creates a session in step 228 of FIG. 17A. As shown, when a resource creates a session the resource allocates instance data and initializes the session in step 240. In step 242 the resource determines if other sessions are needed in step 242. If so, then ViOpen is called on those other resources in step 244 and control returns to step 242. If other sessions are not needed, then control advances to step 230 in FIG. 17A. It is noted that, if sessions to other resources are needed, when those sessions are actually created is indeterminate. If in order to create the data for a particular session it is first necessary to first open sessions to other resources, then these sessions are opened prior to the particular session. However, if in order to open these sessions it is necessary to first define how much space is available to create data, then these sessions may be opened after opening the particular session.

Figure 19:
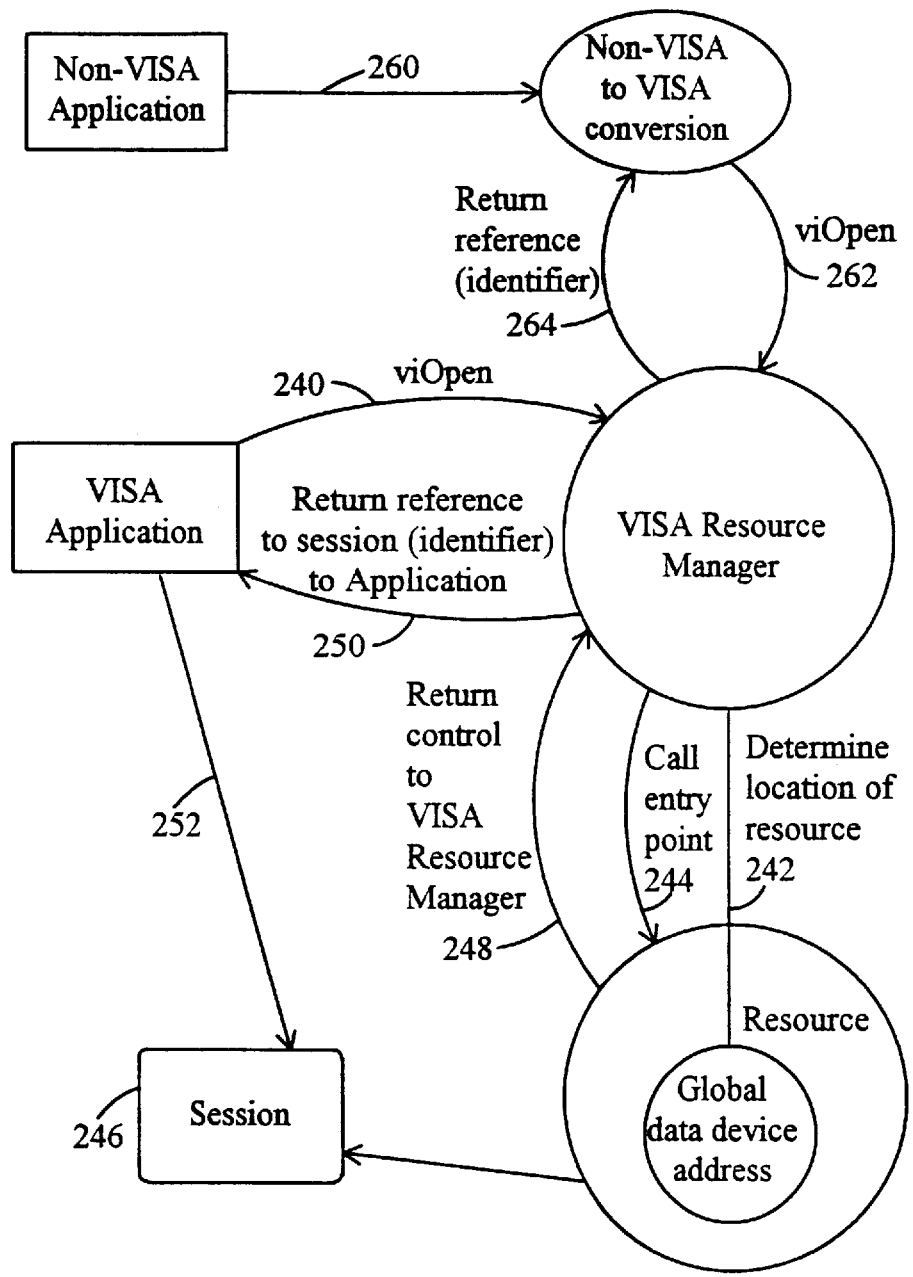
FIG. 19 is similar to FIG. 18 but also illustrates a Non-VISA to VISA conversion.

Non-VISA Application Utilizing a Mapping Library to Open a Session to VISA Resources FIG. 19 is a diagram similar to FIG. 18, but also shows how a non-VISA application, such as an application written for the SICL Driver level library, undergoes a conversion that enables it to talk to a VISA system. As shown, a non-VISA application which was developed according to a different software architecture can open sessions with VISA resources within a VISA system by means of the non-VISA to VISA conversion block, as shown. The non-VISA to VISA conversion block also receives instructions from the non-VISA application and transmits various operations to the VISA Resource Manager 140 to implement the steps in the non-VISA application.

Conclusion

Therefore, a system and method for controlling an instrumentation system is shown and described. Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. An instrumentation system for controlling one or more instruments, wherein the instrumentation system comprises:
   a computer system including a central processing unit and memory;
   one or more instruments coupled to the computer system;
   at least one input/output interface coupled between the computer system and said instruments;
   an object class stored in the memory of the computer system which provides operation control, attribute services, and object lifecycle services;
   an object manager stored in the memory of the computer system for creating and distributing objects derived from the object class;
   a session class stored in the memory of the computer system which derives functionality from the object class and provides functionality to identify and control individual sessions to a resource, including event management, extended attribute control, and access control;
   a resource class stored in the memory of the computer system which derives functionality from the object class and provides global variable capabilities;
   a plurality of instrument control resource classes stored in the memory of the computer system which provide functionality for controlling instrument device capabilities of said one or more instruments, wherein said plurality of instrument control resource classes each derive functionality from said session class and said resource class;
   a plurality of instrument control resources stored in the memory of the computer system for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system;
   a resource manager stored in the memory of the computer system for providing user control, communication and access to said plurality of instrument control resources, wherein said resource manager maintains a data structure comprising information on said instrument control resources; and an instrument control program stored in memory of the computer system using one or more of said plurality of instrument control resources, wherein said instrumentation control program controls the instrumentation system, wherein said instrumentation control program executes regardless of said input/output interface type used in said instrumentation system.

2. The instrumentation system of claim 1,
   wherein said plurality of instrument control resource classes comprise a first number of common resource classes which have commonality with two or more input/output interface types, and a second number of specific resource classes which control features specifically for a single type of input/output interface.

3. The instrumentation system of claim 1, further comprising:
   at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

4. The instrumentation system of claim 1, wherein said input/output interface type used in said instrumentation system comprises one of the group consisting of VXI, GPIB, and serial.

5. The instrumentation system of claim 1, wherein said plurality of instrument control resources comprise:
   an instrument resource for communicating with and controlling said one or more instruments.

6. The instrumentation system of claim 1, wherein said plurality of instrument control resources comprise:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

7. The instrumentation system of claim 6, wherein said plurality of instrument control resources further comprise:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

8. The instrumentation system of claim 6, wherein said plurality of instrument control resources further comprise:

a plurality of GPIB specific resources for performing GPIB specific operations on the one or more instruments.

9. The instrumentation system of claim 6, wherein said plurality of instrument control resources further comprise:

a plurality of VXI specific resources for performing VXI specific operations on the one or more instruments.

10. The instrumentation system of claim 6, wherein said plurality of instrument control resources further comprise:

a plurality of serial specific resources for performing VXI specific operations on the one or more instruments.

11. The instrumentation system of claim 1, wherein said instrumentation control program includes an open instruction which specifies one or more of said plurality of instrument control resources;

wherein said resource manager comprises:

means for determining the location of said one or more of said plurality of instrument control resources specified in said open instruction;

means for creating one or more sessions with said one or more of said plurality of instrument control resources;

means for providing one or more identifiers to said instrument control program corresponding to said one or more sessions.

12. The instrumentation system of claim 11, wherein said instrumentation control program further comprises:

means for invoking operations on said one or more of said plurality of instrument control resources, wherein said invoked operations cause said resources executing on said computer system to control at least one of said one or more instruments.

13. The instrumentation system of claim 11, wherein said at least one input/output interface has one or more types;

wherein said plurality of instrument control resources are based on said one or more types of the at least one input/output interface and said one or more instruments comprised in said instrumentation system.

14. The instrumentation system of claim 1, wherein a plurality of said plurality of instrument control resources each control individual capabilities of said one or more instruments.

15. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said instruments, the method comprising:

providing an object class stored in the memory of the computer system which provides operation control, attribute services, and object lifecycle services;

providing an object manager stored in the memory of the computer system for creating and distributing objects derived from the object class;

providing a session class stored in the memory of the computer system which derives functionality from the object class and provides functionality to identify and control individual sessions to a resource, including event management, extended attribute control, and access control;

providing a resource class stored in the memory of the computer system which derives functionality from the object class and provides global variable capabilities;

providing a plurality of instrument control resource classes stored in the memory of the computer system which provide functionality for controlling instrument device capabilities of said one or more instruments, wherein said plurality of instrument control resource classes each derive functionality from said session class and said resource class;

generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system;

providing a resource manager stored in the memory of the computer system for providing user control, communication and access to said plurality of instrument control resources;

constructing an instrumentation control program which uses one or more of said plurality of instrument control resources to control the instrumentation system, wherein said constructing is in response to user input; and said instrumentation control program executing to control the instrumentation system, wherein said instrumentation control program executes regardless of said input/output interface type used in said instrumentation system.

16. The method of claim 15, wherein said providing said plurality of instrument control resource classes comprises providing a first number of common resource classes which have commonality with two or more input/output interface types, and a second number of specific resource classes which control features specifically for a single type of input/output interface.

17. The method of claim 15, further comprising:

providing at least one resource template comprising interface functions used in controlling and communicating with said plurality of instrument control resources;

said plurality of instrument control resources inheriting functionality from said at least one resource template, wherein said at least one resource template does not include instrumentation-specific interface functions.

18. The method of claim 15, wherein said input/output interface type used in said instrumentation system comprises one of the group consisting of VXI, GPIB, and serial.

19. The method of claim 15, wherein said providing said plurality of instrument control resources comprises providing an instrument resource for communicating with and controlling said one or more instruments.

20. The method of claim 15, wherein said providing said plurality of instrument control resources comprises providing:
- a read resource for reading values from the one or more instruments;
- a write resource for writing values to the one or more instruments;
- a trigger resource for triggering the one or more instruments;
- a poll resource for polling the one or more instruments; and
- a clear resource for clearing the one or more instruments.

21. The method of claim 20, wherein said providing said plurality of instrument control resources further comprises providing:
- a format resource for formatting values provided to the one or more instruments;
- one or more access resources for providing register level access to the one or more instruments;
- a device command resource for providing commands to the one or more instruments; and
- a status/service request resource for requesting services, and for detecting requests for service and procuring status information.

22. The method of claim 20, wherein said providing said plurality of instrument control resources further comprises providing a plurality of GPIB specific resources for performing GPIB specific operations on the one or more instruments.

23. The method of claim 20, wherein said providing said plurality of instrument control resources further comprises providing a plurality of VXI specific resources for performing VXI specific operations on the one or more instruments.

24. The method of claim 20, wherein said providing said plurality of instrument control resources further comprises providing a plurality of serial specific resources for performing VXI specific operations on the one or more instruments.

25. The method of claim 15, wherein said instrumentation control program includes an open instruction which specifies one or more of said plurality of instrument control resources, the method further comprising:
- said resource manager determining the location of said one or more of said plurality of instrument control resources specified in said open instruction;
- said resource manager creating one or more sessions with said one or more of said plurality of instrument control resources; and
- said resource manager providing one or more identifiers to said instrument control program corresponding to said one or more sessions.

26. The method of claim 25, further comprising:
said instrumentation control program invoking operations on said one or more of said plurality of instrument control resources; and
said one or more of said plurality of instrument control resources executing on said computer system to control at least one of said one or more instruments in response to said invoked operations.

27. The method of claim 15, further comprising:
executing said instrumentation control program to control said instrumentation system;
wherein said executing comprises:
- receiving an open instruction which specifies one or more of said plurality of instrument control resources;
- determining the location of said one or more of said plurality of instrument control resources specified in said receiving an open instruction;
- creating one or more sessions with said one or more of said plurality of instrument control resources; and
- providing one or more identifiers to said instrument control program corresponding to said one or more sessions.

28. The method of claim 15, wherein said at least one input/output interface has one or more types;
wherein said generating generates said plurality of instrument control resources based on said one or more types of the at least one input/output interface and said one or more instruments comprised in said instrumentation system.

29. The method of claim 28, further comprising:
determining the input/output interface types and instruments comprised in said instrumentation system;
wherein said generating said plurality of instrument control resources comprises utilizing said plurality of resource classes and said determined input/output interface types and instrument types to create said plurality of instrument control resources.

30. The method of claim 15, further comprising:
registering said plurality of instrument control resources with said resource manager after said generating said plurality of instrument control resources and after said providing said resource manager.

31. The method of claim 15, wherein said computer system communicates with said instruments through a type of input/output interface, the method further comprising:
executing said instrumentation control program to control said instrumentation system, wherein said instrumentation control program executes regardless of said input/output interface type used in said instrumentation system.

32. The method of claim 15, wherein a plurality of said plurality of instrument control resources each control individual capabilities of said one or more instruments.

33. A computer-readable storage media for operating in an instrumentation system, the instrumentation system comprising a computer system including a central processing unit, one or more instruments coupled to the computer system, and at least one input/output interface coupled between the computer system and the instruments, wherein the computer-readable storage media includes a substrate having a physical configuration representing data, the storage media comprising:
- an object class comprised on the storage media which provides operation control, attribute services, and object lifecycle services;
- an object manager comprised on the storage media for creating and distributing objects derived from the object class;
- a session class comprised on the storage media which derives functionality from the object class and provides functionality to identify and control individual sessions to a resource, including event management, extended attribute control, and access control;

a resource class comprised on the storage media which derives functionality from the object class and provides global variable capabilities;

a plurality of instrument control resource classes comprised on the storage media which provide functionality for controlling instrument device capabilities of said one or more instruments, wherein said plurality of instrument control resource classes each derive functionality from said session class and said resource class;

a plurality of instrument control resources comprised on the storage media for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system;

a resource manager comprised on the storage media for providing user control, communication and access to said plurality of instrument control resources, wherein said resource manager maintains a data structure comprising information on said instrument control resources; and an instrumentation control program comprised on the storage media using one or more of said plurality of instrument control resources, wherein said instrumentation control program controls the instrumentation system, wherein said instrumentation control program executes regardless of said input/output interface type used in said instrumentation system.

34. The computer-readable storage media of claim 33, wherein said plurality of instrument control resource classes comprise a first number of common resource classes which have commonality with two or more input/output interface types, and a second number of specific resource classes which control features specifically for a single type of input/output interface.

35. The computer-readable storage media of claim 33, further comprising:

at least one resource template comprised on the storage media comprising interface functions used in controlling and communicating with said plurality of instrument control resources, wherein said plurality of instrument control resources inherit functionality from said at least one resource template, wherein said at least one resource template does not include instrumentation-specific interface functions.

36. The computer-readable storage media of claim 33, wherein said plurality of instrument control resources includes an instrument resource for communicating with and controlling the one or more instruments.

37. The computer-readable storage media of claim 33, wherein said plurality of instrument control resources comprise:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

38. The computer-readable storage media of claim 37, wherein said plurality of instrument control resources further comprise:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

39. The computer-readable storage media of claim 37, wherein said plurality of instrument control resources further comprise:

a plurality of GPIB specific resources for performing GPIB specific operations on the one or more instruments.

40. The computer-readable storage media of claim 37, wherein said plurality of instrument control resources further comprise:

a plurality of VXI specific resources for performing VXI specific operations on the one or more instruments.

41. The computer-readable storage media of claim 37, wherein said plurality of instrument control resources further comprise:

a plurality of serial specific resources for performing VXI specific operations on the one or more instruments.

42. The computer-readable storage media of claim 33, wherein said instrumentation control program includes an open instruction which specifies one or more of said plurality of instrument control resources;

wherein said resource manager comprises:

means comprised on the storage media for determining the location of said one or more of said plurality of instrument control resources specified in said open instruction;

means comprised on the storage media for creating one or more sessions with said one or more of said plurality of instrument control resources;

means comprised on the storage media for providing one or more identifiers to said instrument control program corresponding to said one or more sessions.

43. The computer-readable storage media of claim 42, wherein said instrumentation control program further comprises:

means comprised on the storage media for invoking operations on said one or more of said plurality of instrument control resources, wherein said invoked operations cause said resources executing on said computer system to control at least one of said one or more instruments.

44. The computer-readable storage media of claim 42, wherein said at least one input/output interface has one or more types;

wherein said plurality of instrument control resources are based on said one or more types of the at least one input/output interface and said one or more instruments comprised in said instrumentation system.

45. The computer-readable storage media of claim 33, wherein a plurality of said plurality of instrument control resources each control individual capabilities of said one or more instruments.

* * * * *